United States Patent [19]

Banks et al.

[11] Patent Number: 4,538,225

[45] Date of Patent: Aug. 27, 1985

[54] TABLE-DRIVEN APPARATUS FOR DATA DISPLAY AND MODIFICATION

[76] Inventors: Edwin R. Banks, 1208 Country Ct., Cary, N.C. 27511; Roger C. Ray, SW. 9320 Royal Woodlands, Beaverton, Oreg. 97005; Paul B. Dale, 210 Old Westboro Rd., North Grafton, Mass. 01536

[21] Appl. No.: 358,509

[22] Filed: Mar. 15, 1982

[51] Int. Cl.[3] .......................... G06F 3/023; G06F 3/14; G06F 9/00

[52] U.S. Cl. .......................................................... 364/200

[58] Field of Search ... 364/200 MS File, 900 MS File

[56] References Cited

U.S. PATENT DOCUMENTS

| | | | |
|---|---|---|---|
| 3,810,107 | 5/1974 | Goldman et al. | 364/200 |
| 3,815,104 | 6/1974 | Goldman | 364/200 |
| 3,967,263 | 6/1976 | Chang et al. | 364/200 |
| 4,180,854 | 12/1979 | Walden et al. | 364/200 |
| 4,428,043 | 1/1984 | Cutillar et al. | 364/200 |

*Primary Examiner*—Harvey E. Springborn

[57] ABSTRACT

Data modification and display apparatus for use in a digital computer system together with a method employing data modification and display apparatus for modifying and displaying data. The data modification and display apparatus has a memory containing buffer sections for storing data codes representing data to be modified, control data including a state value for controlling modification and display of data, an editing table containing editing instruction sequences for modifying the contents of the buffer, modifying the control data, and producing display codes, a terminal with a keyboard for providing input codes and a screen for displaying visual representations in response to display codes, and a processor. Editing instruction sequences are divided into sections corresponding to certain state values and editing instructions include instructions to which the processor responds by altering state value. The sections may include sections controlling display of display codes on the screen, a section containing instructions to be executed at the beginning of operation of the apparatus and a section to be executed on termination of operation of the apparatus. More than one editing table may be provided, and programs using data modification and display apparatus may select an editing table.

36 Claims, 8 Drawing Figures

INITIAL MACRO SIZE 803

FINAL MACRO SIZE 813

IM 806

| ROW \ COLUMN | 1 | 2 | 3 | 4 | 5 | 6 | 7 | 8 |
|---|---|---|---|---|---|---|---|---|
| 1 | 0002 | 0000 | 0007 | 0002 | 0000 | 001B | 00BA | 00C5 |
| 2 | 00D0 | 00D6 | 00DE | 00EC | 00F9 | 429B | 207F | 0176 |
| 3 | 0909 | 0820 | 9196 | 4D08 | E093 | B100 | 1F06 | 049A |
| 4 | 404E | DC91 | 207E | 207E | 7B02 | 89EB | 7F7F | 0C89 |
| 5 | 8ABD | 0600 | E994 | E994 | 0503 | E918 | 180D | 0188 |
| 6 | BE7B | 0289 | EB94 | EB94 | 0501 | E919 | 190D | 8988 |
| 7 | BE7B | 0201 | EB94 | EB94 | 0502 | E901 | 0117 | 0198 |
| 8 | 037B | 0397 | 9804 | 9804 | C47B | 0487 | 967B | 0301 |
| 9 | DC98 | 0394 | 6E08 | 6E08 | 4701 | E1BD | 4C01 | DC94 |
| 10 | 8296 | 0147 | DD98 | DD98 | 027B | 0388 | 9DEB | 0505 |
| 11 | 0442 | 939B | 6102 | 6102 | 0164 | 0606 | 0202 | 640B |
| 12 | 0B05 | 4C8A | 0600 | 0600 | 0901 | 7710 | 1002 | 0364 |
| 13 | 1515 | 0701 | 664C | 664C | 00E9 | 1E1E | 0204 | 640A |
| 14 | 0F01 | 7800 | FF08 | FF08 | 4E8D | 9DEB | 0064 | 00FF |
| 15 | 087B | 024E | 8C9D | 8C9D | 6400 | FF03 | 7700 | 6400 |
| 16 | FF05 | 0504 | E900 | 6400 | FF0B | 418F | 4E65 | 963C |
| 17 | 6494 | 8296 | 7900 | 000A | 507B | 01E5 | BD03 | 6596 |
| 18 | 3C64 | | | | | | | |

ES 805

ES 807

P/O ES 811

DEFAULT TABLE 801

ES 811

ES 809

LOCATOR INFORMATION 201: 1,1 TO 1,5
DISPATCH TABLE 203: 1,6 TO 2,5
INITIAL SEQUENCE 205: 2,6
FINAL SEQUENCE 207: NONE
DISPLAY SEQUENCES 209: 2,7 TO 4,2
BUFFER EDITING SEQUENCE 211: 4,3 TO 18,1
SEQUENCE FOR STATE = 0: 4,3 TO 14,2
= 1: 14,2 TO 14,7
= 2: 14,8 TO 15,5
= 3: 15,5 TO 15,8
= 4: 15,8 TO 16,4
= 5: 16,4 TO 17,3
= 6: 17,3 TO 18,1

FIG. 8

TABLE-DRIVEN APPARATUS FOR DATA DISPLAY AND MODIFICATION

BACKGROUND OF THE INVENTION

1. Field of the Invention

The present invention relates generally to data modification apparatus in a digital data processing system, and more specifically to apparatus in an input-output system including a terminal keyboard and a terminal display for displaying data to be modified by a user of the system, permitting a user to modify data by means of keystrokes from a terminal, and displaying the results of the modifications on a terminal display.

2. Description of Prior Art

In the prior art, users of computer systems have modified data from a terminal by means of general-purpose editing programs and single-purpose editing functions for specific applications.

General-purpose editing programs provide a broad array of functions for modifying data. Such programs work by receiving editing commands from a terminal. In response to an editing command, the editing program displays data, modifies data, and displays modified data. Many general-purpose editing programs have a macro capability, i.e, they allow users to make and execute macros, that is, programs consisting of sequences of editing functions. Such a macro capability thus provides a user with a way of making new editing functions out of combinations of editing instructions. Some general-purpose editing programs also provide ways of associating a macro with a key of a terminal, so that a user can execute the macro by means of a single keystroke. Using this capability, a user may make a general-purpose editing program serve a variety of special purposes.

However, the power of a general-purpose editing program is not without cost. A general-purpose editing program requires a considerable amount of memory for its code, and commencing and terminating operation of a general-purpose editing program require a considerable amount of time. The size of a general-purpose editing program limits its usefulness in applications where memory is at a premium, for example in "smart" terminals, i.e., terminals having local memory and processing capabilities. The time required to commence and terminate operation of a general-purpose editing program is excessive in programs which do not have editing as their main purpose, but instead perform a few editing operations in the course of other operations.

Programs which perform a few editing operations are particularly common in interactive applications, that is, where a program responds to commands or data from a terminal. In order for the program to be useful, a user must be able to see what he has input into the terminal and must be able to modify his input if it is in error. Since time and space requirements of a general-purpose editing program are excessive for such applications, the prior art has incorporated simple editing capabilities into many special-purpose programs. By so doing, the prior art has avoided overhead involved in using the general purpose editor, but has increased the complexity of special-purpose programs and has thereby made them more difficult to write and maintain. To some extent, too, including simple editing capabilities in special-purpose programs wastes memory space: each special-purpose program may require essentially the same editing functions, but because there are minor differences, the editing functions cannot be combined into a single program used by all.

The trend towards digital data processing systems whose components are connected into networks has increased the need for data display and modification apparatus which have the generality and availability of the general-purpose editors but do not have their overhead. In network systems, each transmission of data over the network involves considerable overhead, and consequently, efficiency requires as few transmissions as possible to accomplish a given task. One way to reduce the number of transmissions is to distribute processing capability throughout a system, for example, by providing terminals in a system with local microprocessors and memory. In such a system, modifications on data stored in a terminal's memory may be performed using the terminal's microprocessor. Consequently, modification of data such as a line of ASCII characters may require only two transmissions: one to transmit data to be modified to a terminal, and a second to transmit modified data from the terminal to other parts of the system.

Neither approach used by the prior art to data display and modification is advantageous is a network system. Both general-purpose editing programs and special-purpose programs containing data display and modification components are generally too large to fit into the limited memory available in an individual terminal, and individual editing commands must therefore be sent in separate transmissions from a terminal to the processor upon which the general-purpose editing program or the special purpose program is executing. The separate transmissions contain far less data than the maximum amount which could be included in such a transmission, resulting in an inefficient use of the network.

In order to make more efficient use of a network, the art has provided limited data display and modification capabilities for individual terminals. In a terminal with such a capability, data display and modification is carried out by sending all of the data to be displayed and modified in a single transmission from a central processor to the terminal memory, performing modifications, and then returning modified data in a single transmission to the central processing unit. However, the price for efficient use of the network has been restricting all programs which use the terminal to a single set of data display and modification operations provided by the terminal.

The present invention provides improved data display and modification apparatus with features which solve the above-mentioned problems of the prior art.

SUMMARY OF THE INVENTION

The present invention provides a data display and modification apparatus, termed herein an Editing Device (ED), which requires only a limited amount of memory, provides powerful general-purpose capabilities, can be programmed to provide different users with different data display and modification capabilities, and is uniquely suited for use in networks.

An ED consists of the following elements:

- a Display, such as a terminal screen, for displaying data;
- Input Apparatus, such as a terminal keyboard, for inputting input codes describing data modifications and data to be used in modifications;
- Memory at least for a Working Buffer for storing data codes representing the data to be modified and for Control Data used to control modification and display of data, A Processor for modifying data in response to input codes and controlling display of data on the Display; and an Editing Table containing table entries corresponding to one or more data codes or input codes.

Each table entry in an Editing Table consists of a sequence of editing instructions which control the manner in which the ED responds to a set of input or data codes. As prescribed by editing instructions, the ED may modify the contents of the Working Buffer, modify the display of data on the Display, or modify Control Data. Some embodiments of the ED may use a number of Editing Tables, and programs employing these embodiments may specify which Editing Table an ED is to obtain editing instructions from. In EDs in "smart" terminals, an Editing Table may be provided to the terminal along with the data the ED is to modify.

While an ED using a specific Editing Table is not as powerful as a general-purpose editor, the fact that an ED can use a variety of Editing tables gives it the generality of a general-purpose editor without the memory space requirements and time penalties inherent in general-purpose editors. The size of an ED makes it particularly adapted to use in a "smart" terminal, and the capability of receiving an Editing Table along with data gives "smart" terminals employing an ED more flexible editing capabilities than would otherwise be possible.

It is thus a primary object of the present invention to provide an improved data processing system.

It is also an object of the present invention to provide apparatus for displaying data and modifying displayed data in response to input codes which is more flexible and efficient than that provided by the prior art.

It is a further object of the present invention to provide data display and modification apparatus wherein an Editing Table determines the manner in which the data display and modification apparatus responds to input codes and displays the data.

It is still another object of the present invention to provide data display and modification apparatus using a plurality of Editing Tables.

It is a yet further object of the present invention to provide data display and modification apparatus particularly suited to use in network systems.

Other objects, advantages, and features of the present invention will be understood by those of ordinary skill in the art after referring to the following detailed description of the preferred embodiment and drawings.

BRIEF DESCRIPTION OF THE DRAWINGS

FIG. 8 is a hexadecimal representation of a specific Editing Table in an embodiment of the present invention.

DESCRIPTION OF THE PREFERRED EMBODIMENTS

The following description of the preferred embodiments first presents an overview of the Editing Device (ED), then discusses various ways in which the ED may be incorporated into data processing systems, and finally discusses one embodiment of the ED in detail. In these discussions, parts of instruction sequences are often described as performing actions. In fact, of course, the actions are performed by the processor which executes the instructions. The usage which attributes the actions to the instruction sequences is common among those skilled in the art and is employed here for the sake of clarity of presentation.

1. Overview of the Invention—FIG. 1

Figure 1:
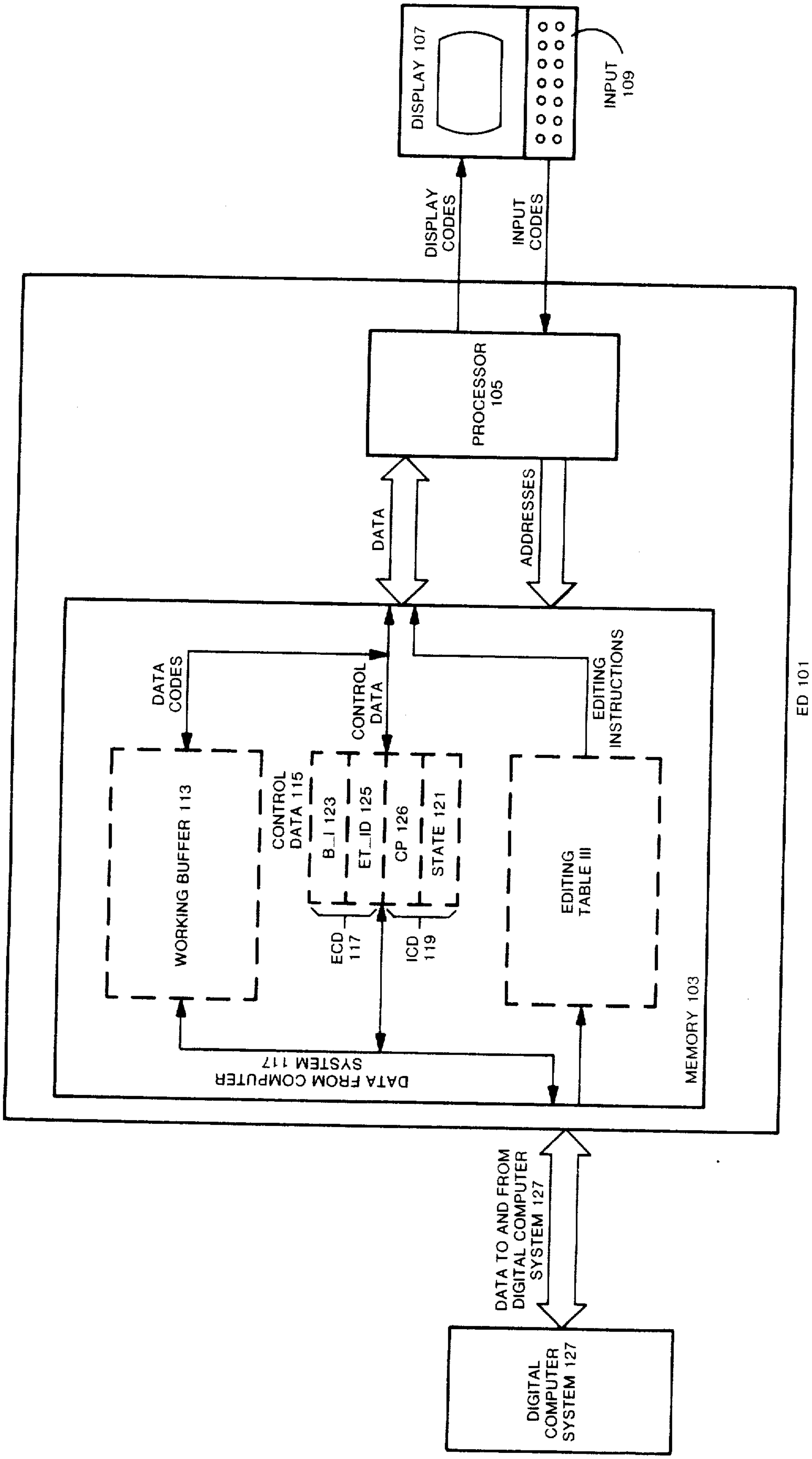
FIG. 1 is a block diagram of a digital computer system including the present invention.

FIG. 1 is a conceptual block diagram which provides an overview of the ED. Therein is shown ED 101, which receives data from Data Processing System (DP) 127, modifies the data, and returns it to DP 127. ED 101 is further connected to Input 109 and to Display 107. As indicated by arrows joining Interpreter 101 and Input 109 and Interpreter 101 and Display 107, Interpreter 101 receives input codes from Input 109 and outputs display codes to Display 107. Input codes received from Input 109 direct the manner in which data received from DP 127 is to be modified and provide additional data to be used in modifying data received from DP 127, while Display 107 responds to display codes by displaying visual representations of that data as received from DP 127 and as modified in response to input codes from Input 109.

In most embodiments, both Input 109 and Display 107 are part of a terminal, Input 109 being the terminal's keyboard and Display 107 the terminal's CRT, or in the case of hard copy terminals, the paper upon which the terminal types its output. In a present embodiment, input codes are 1-byte (eight-bit) ASCII codes which the terminal produces in response to key strokes. In other embodiments, input codes may be EBCDIC codes or special input codes, and input codes may be longer or shorter than 8 bits. Similarly, in a present embodiment, display codes are ASCII codes, augmented by special display control codes, but other display codes, such as EBCDIC codes or special display codes, are possible.

2. Components of ED 101

ED 101 has two main components: Memory 103 and Processor 105. Processor 105 provides addresses to Memory 103 and either fetches data from Memory 103 at a location specified by an address or stores data in Memory 103 at a location specified by an address. These addressing, fetching, and storing operations are indicated in FIG. 1 by < and > symbols showing addresses being transmitted from Processor 105 to Memory 103 and data being transmitted in both directions. In addition, Processor 105 performs operations on data fetched from Memory 103, receives input codes from Input 109, and provides display codes for Display 107.

2.1. Memory 103

Memory 103 contains data codes to be modified by ED 101 in response to input codes received from Input 109, one or more Editing Tables containing instructions directing modification and display of visual representations of data codes before and after modification on Display 107, and control data used to control ED 101. In FIG. 1, various kinds of information contained in Memory 103 are indicated by dashed boxes. Flow of information between DP 127, Memory 103, and Processor 105 is indicated by arrows between DP 127, Processor 105 and the boxes representing the information. Turning first to Working Buffer 113, Working Buffer 113 contains data codes received for display and/or modification from DP 127. As indicated by arrows between Working Buffer 113 and DP 127 and between Working Buffer 113 and Processor 105, Working Buffer 113 receives data codes from DP 127 at the beginning of the operation of ED 101 and returns data codes to DP 127 on termination of operation of ED 101. During ED 101's operation, Processor 105 both reads data codes from and writes data codes to Working Buffer 113.

Control Data 115 contains data used to control Processor 105 as Processor 105 causes Display 107 to display the contents of Working Buffer 113 and modifies the contents in response to input codes from Input 109. Data in Control Data 115 may be provided from two main sources: Data in External Control Data (ECD) 117 may be provided by DP 127 at the beginning of operation of ED 101 and may be returned to DP 127 at the end of ED 101's operation; Data in Internal Control Data (ICD) 119 is produced during the operation of ED 101. As the an arrow in FIG. 1 indicates, Processor 105 may both read data from and write data to Control Data 115. Data contained in Control Data 115 includes State 121, a value which determines the location in Editing Table 111 from which ED 101 obtains editing instructions corresponding to a specific input code from Input 109, BI 123, a value which specifies a position in Working Buffer 113, and CP 126, a value which specifies a position of a cursor in Display 107. The cursor position so specified corresponds to the location specified by BI 123 in Working Buffer 113, and consequently, CP 126 is dependent on BI 123; whenever ED 101 changes the value of BI 123, it changes the value of CP 126. In embodiments of the present invention having more than one Editing Table 111 in Memory 103, ETID 125, finally, is a value specifying which Editing Table 111 ED 101 is currently using.

Editing Table 111 contains sequences of Editing Instructions which determine how Processor 105 modifies the contents of Working Buffer 113 and/or values in Control Data 115 in response to input codes from Input 109 and how Processor 105 causes Display 107 to respond to these modifications. Processor 105 may read Editing Instructions from Editing Table 111, but may not modify Editing Table 111. As specified by arrows in FIG. 1, in some embodiments of the present invention, DP 127 may provide an Editing Table 111 to ED 101 at the beginning of operation of ED 101; in other embodiments, ED 101, Editing Tables 111 may be contained in read only memory belonging to ED 101.

2.2. Overview of Contents of Editing Table 111—FIG. 2

Figure 2:
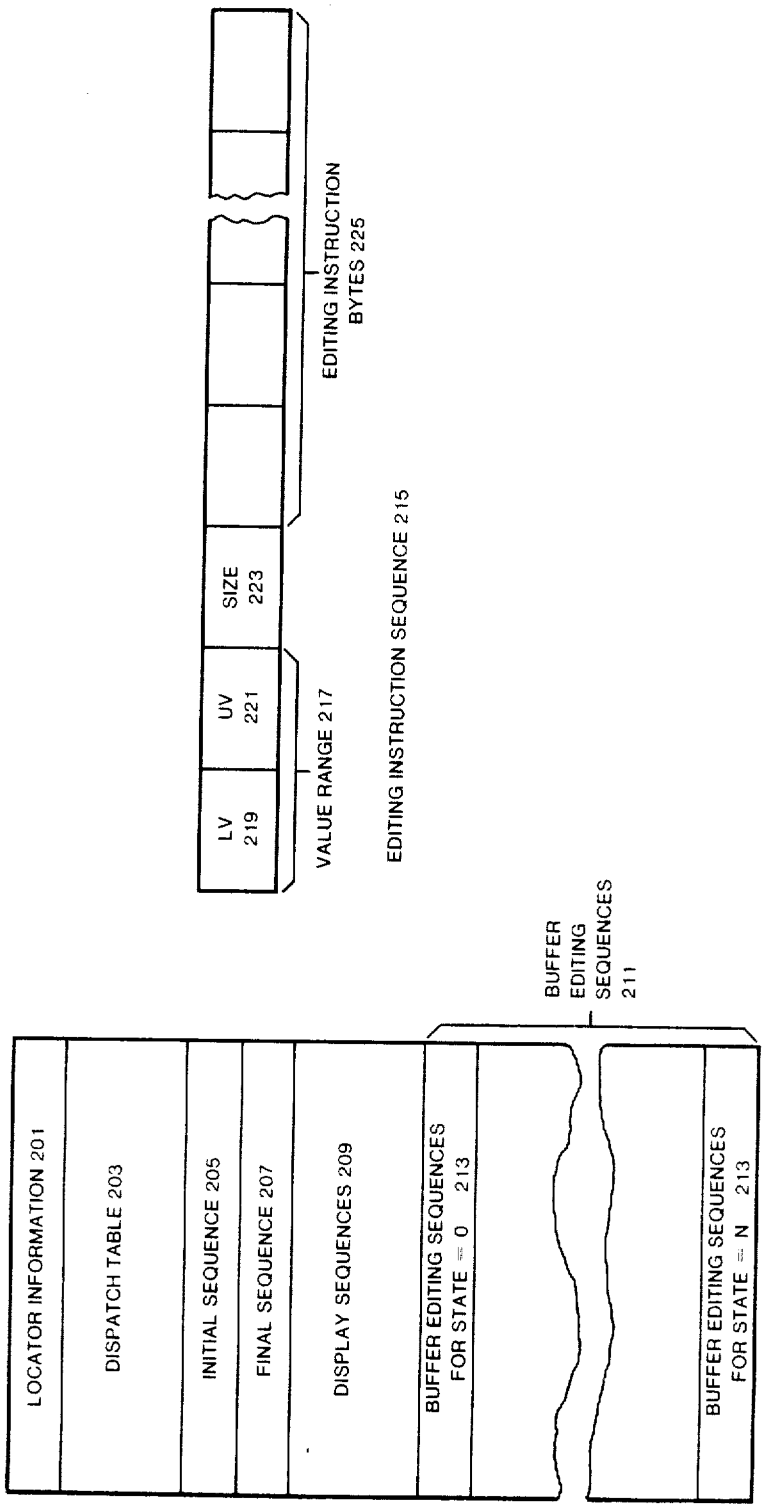
FIG. 2 is a diagram of an Editing Table and an Editing Instruction Sequence of the present invention.

Turning next to the overview of the contents of Editing Table 111 contained in FIG. 2, it may be seen that Editing Table 111 in a present embodiment may have following parts:

- Locator Information 201, containing information used by Processor 105 to locate Editing Instruction Sequences in Editing Table 111;
- Dispatch Table 203, containing information used by Processor 105 to locate a set of Editing Instruction Sequences corresponding to a given value of State 121;
- Initial Sequence 205, containing an Editing Instruction Sequence which is executed when ED 101 begins operation;
- Final Sequence 207, containing an Editing Instruction Sequence which is executed when ED 101 finishes operation;
- Display Sequences 209, containing Editing Instruction Sequences corresponding to data codes contained in Working Buffer 113;
- Buffer Editing Sequences 211, containing sets of Editing Instruction Sequences corresponding to values of input codes from Input 109 and to values of State 121. As may be seen from FIG. 2, all Editing Instruction Sequences corresponding to a given value of State 121 are grouped together in a single Buffer Editing Sequences 213 for that value of State 121.

Editing Instruction Sequences contained in Buffer Editing Sequences 211 and Display Sequences 209 are represented by Editing Instruction Sequence 215 in FIG. 2. In a present embodiment, Editing Instruction Sequence 215 is a sequence of bytes. The first two bytes, LV 219 and UV 221, define a range of 8-bit codes for which Editing Instruction Sequence 215 is valid; the third byte, Size 223, specifies the number of bytes in Editing Instruction Sequence 215 excluding LV 219, UV 221, and Size 223; the remaining bytes are Editing Instruction Bytes 225. Editing Instruction Bytes 225 control response of Processor 105 to an input code input from Input 109 or a data code input from Working Buffer 113. Editing Instruction Bytes 225 may specify operation codes and operands. Operands may be variables, stored in Control Data 115, or they may be literal values.

Editing Instruction Sequences in Initial Sequence 205 and Final Sequence 207 resemble those of Display Sequences 209 and buffer Editing Sequences 211, but have neither LV Byte 219, UV Byte 221, nor Size Byte 223.

3. Overview of the Operation of ED 101

Operation of ED 101 is initiated when DP 127 executes a program which performs operations requiring the use of ED 101. Under control of the program, DP 127 provides data codes for Working Buffer 113 and values for ECD 117 including at least a value for BI 123 specifying a location in Working Buffer 113. In embodiments having more than one Editing Table 111, ECD 117 may also include a value for ET-ID 125 specifying one of Editing Tables 111 available to ED 101.

When ED 101 begins operation, it first initializes State 121 to an initial value, 0, and then locates Initial Sequence 205 in Editing Table 111 and executes all Editing Instructions contained in Initial Sequence 205. Next, ED 101 displays the contents of Working Buffer 113 on Display 107. It does so by retrieving data codes placed in Working Buffer 113 one at time and for each data code, locating Editing Instruction Sequence 225 in Display Sequences 209 corresponding to that data code. It then executes that sequence in Display Sequences 209 and responds thereto by producing one or more display codes corresponding to that data code. Display 107 then produces a visual representation in response to the display codes. For example, if a data code is one representing a printable ASCII character, Editing Instruction Sequence 225 for those characters produces a display code for that character. Other cases are more complicated; for example, Editing Instruction Sequence 225 corresponding to the ASCII tab character causes ED 101 to produce the number of blank display codes required to reach a position in Display 107 corresponding to the next tab stop. When ED 101 is finished, Display 107 shows a representation of the contents of Working Buffer 113, including a cursor at the position on Display 107 corresponding to the location specified by BI 123 in Working Buffer 113.

ED 101 is now ready to begin receiving input codes from Input 109, modifying the contents of Working Buffer 109 and values in Control Data 115 in accordance with these codes, and displaying the results of these modifications on Display 107.

In the following, three operations of varying degrees of complexity are described. The first of these operations, Move, changes the values of BI 123 and CP 126 and moves a cursor in Display 107 to a position corresponding to BI 123 and CP 126. The second, Search, locates a data code in Working Buffer 113, changes the values of BI 123 and CP 126 to specify the location of the data code, and moves a cursor in Display 107 to the position of the data code. The third, Insert, inserts data codes in Working Buffer 113 at the position specified by the cursor and displays the modified contents of Working Buffer 113 on Display 107.

3.1. A Move Operation

To perform a Move operation, for example, one which moves the cursor one position to the right on Display 107 and changes the values BI 123 and CP 126 to correspond to the new cursor position, a user of a keyboard version of Input 109 strikes a move cursor key. In striking that key, the user sends an input code corresponding to the key to ED 101. Processor 105 receives the input code, and using that input code and the current value of State 121, namely 0, it locates an Editing Instruction Sequence 215 for that input code in Buffer Editing Sequences for State=0 213. Editing Instruction Sequence 215 thus located contains instructions which cause ED 101 to modify the value of BI 123 to indicate a position one data code to the right in Working Buffer 113. Next, ED 101 updates Display 107 to reflect the change in the value of BI 123 by displaying a display code corresponding to the data code at the previous position of BI 123, display codes corresponding to all data codes between the previous and new position of BI 123, and a display code corresponding to a data code at the new position of BI 123. The display codes are produced by taking each data code from Working Buffer 113 and for each data code, executing an Editing Instruction Sequence 215 corresponding to that data code in Display Sequences 209. Each time an Editing Instruction Sequence 215 for a printable display code is executed, ED 101 changes the value of CP 126, so that at the end of a display operation, CP 126 indicates the location of the visual representation on Display 107 corresponding to a data code in Working Buffer 113 specified by BI 123. At the end of a display operation, a visual representation of a cursor is output to Display 107 at the location specified by the value of CP 126. Thus, at the end of a Move operation, a cursor is at the desired location in Display 107 and the values of BI 123 and DP 126 correspond to that location.

3.2. A Search Forward Operation

The search operation discussed herein is a Search Forward operation. This operation searches Working Buffer 113 forward from a current cursor position until it finds a data code corresponding to an input code provided in the Search Forward operation. To perform a Search Forward operation, the user makes two keystrokes: one, of a search key specifying the operation, and another of a key specifying the input code corresponding to the data code to be searched for.

Editing Instruction Sequence 215 corresponding to the input code produced by the search key is also in the portion of Buffer Editing Sequences 211 for State=0. In response to this Editing Instruction Sequence 215, ED 101 sets State 121 to a predetermined value. ED 101 then fetches the next input code, that specifying a data code to be searched for. However, since the value of State 121 has been changed, ED 101 locates Editing Instruction Sequence 215 corresponding to the input code not in Buffer Editing Sequences 213 for State=0, but instead in Buffer Editing Sequences 213 for the current value of State 121. Editing Instruction Sequence 215 at that location contains instructions to which ED 101 responds by starting at the current cursor position and working forward, comparing data codes from Working Buffer 113 with a data code corresponding to the input code which specified the data code to be searched for. If ED 101 finds a matching data code in Working Buffer 113, it resets BI 123 to the location of that data code in Working Buffer 113 and then displays visual representations of the data codes in the searched area of Working Buffer 113 in the manner described for a Move operation on Display 107, and finally resets State 115 to 0. Thus, at the end of a Search Forwared operation, BI 123, CP 126, and a cursor on Display 107 all specify the location of the character being searched for.

An Insert Operation

In an Insert operation, finally, a sequence of data codes specified by input codes is inserted in Working Buffer 113 at the position specified by the cursor. A user of Input 109 may perform the operation by striking an insert key to begin the operation, then striking keys for the input codes corresponding to the data codes being inserted, and finally striking the insert key again to end the operation.

ED 101 may respond to the keystrokes as follows: First, an editing instruction sequence corresponding to the input code provided by the insert key sets a variable in Control Data 115 to indicate that an insert operation is going on and then redisplays the contents of Working Buffer 113 on Display 107. As part of the display operation, ED 101 may check the value of the variable indicating an insert operation, and if the variable indicates that one is going on, ED 101 may modify the display on Display 107 to indicate that an insert operation is in progress. For example, in some implementations, a display may have a "hole" at the cursor for the insertion of new characters, and in others, a display may dim the character at the point of insertion.

A user next hits keys on Input 107 corresponding to the characters he wishes to insert. Since Editing Instructions 225 for the insert input code do not reset State 121, Editing Instruction Sequence 215 which performs the actual insert operation is in Buffer Editing Sequences 213 for State=0. ED 101 responds to that Editing Instruction Sequence 215 by inserting a data code corresponding to the input code at a location specified by BI 123 in Working Buffer 113, updating BI 123 to specify the position following the inserted character, and redisplaying any affected portion of Working Buffer 113 on Display 107 as previously described. When the user has finished inserting characters, he again strikes the insert key. This time, the operation performed is the reverse of the one previously described. Since the variable in Control Data 115 indicates that an insert operation is going on, ED 101 sets it to indicate that it is not. Then ED 101 redisplays the contents of Working Buffer 113 on Display 107. Since no insert operation is going on, the display on Display 107 no longer shows a "hole" or a dimmed character at the cursor.

A user of Input 109 indicates that he has finished using ED 101 by striking a key of Input 109 which produces a delimiter input code. A delimiter input code is one which is defined in Editing Table 111 as one which marks the end of a a use of ED 101. Typical delimiter input codes might be the ASCII new line or carriage return codes. In response to Editing Instruction Sequence 215 for a delimiter input code, contained in Buffer Editing Sequences 213 for State=0, ED 101 ceases fetching input codes from Input 109, executes Editing Instruction Bytes 225 in Final Sequence 207, and indicates to DP 127 that it is finished modifying Working Buffer 113.

4. Alternative Embodiments of ED 101

ED 101's two main components are Processor 105 and Memory 103. In actual digital data processing systems, Processor Means 105 and Memory 103 may be implemented on a variety of components of the data processing system. Some of the implementations are the following:

ED 101 in a System with a Single CPU and a single Memory

In digital data processing systems with a single CPU and a single memory accessible from the CPU, the single CPU serves as Processor 105 and that CPU's memory as Memory 103. This embodiment is presented in FIG. 3.

ED 101 in a System with CPU, IOP, and Shared Memory

Figure 5:
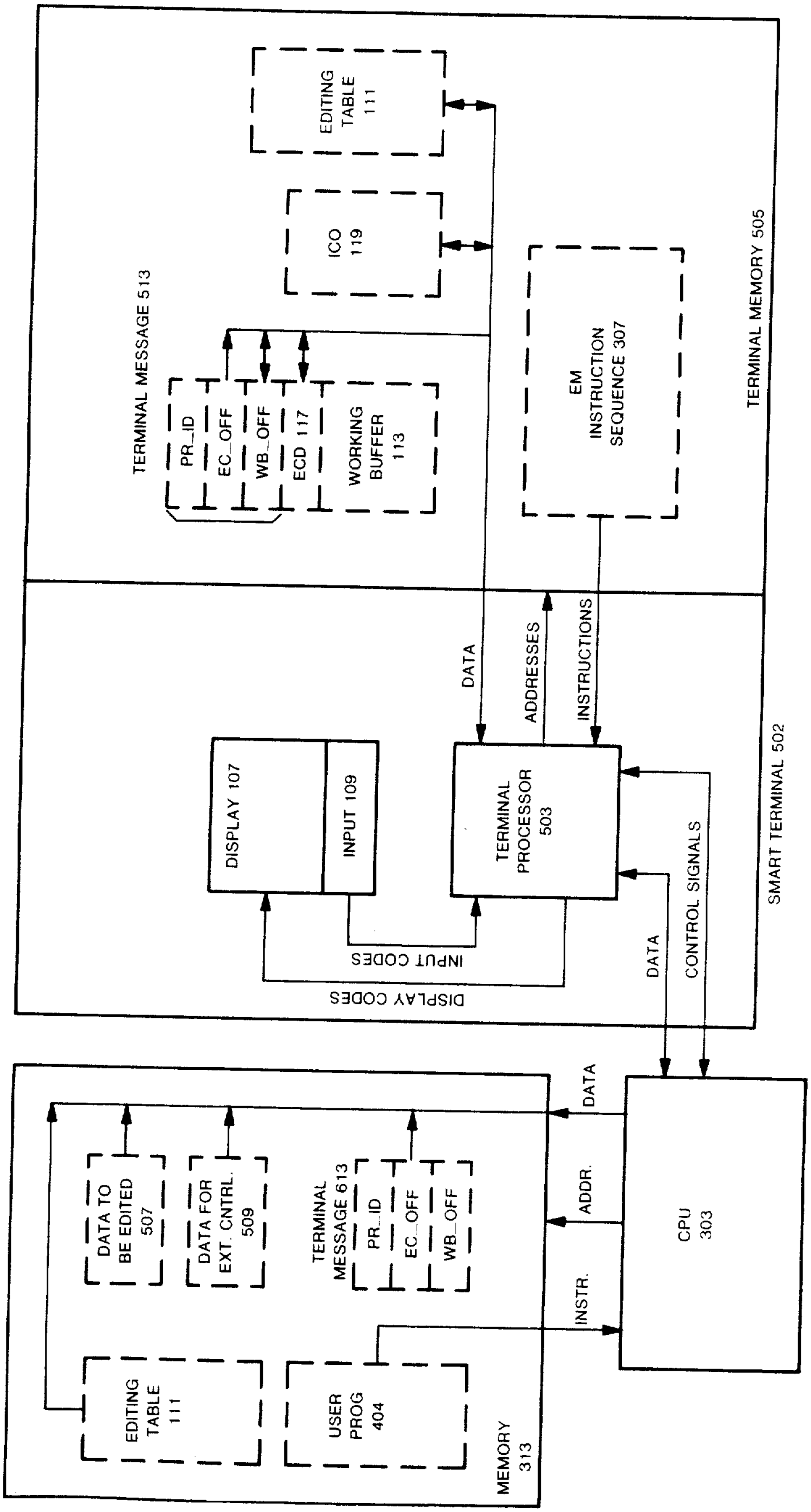
FIG. 5 is a block diagram of a third embodiment of the present invention in a digital data processing system with a "Smart" Terminal.

In digital data processing systems with two processors sharing a single memory, one a general-purpose CPU and the other an Input/Output Processor (IOP), a special-purpose processor dedicated to handling input-/output, the IOP serves as Processor 105 and the shared memory serves as Memory 103. Such an embodiment is illustrated in FIG. 5.

ED 101 in "Smart" Terminals

Figure 6:
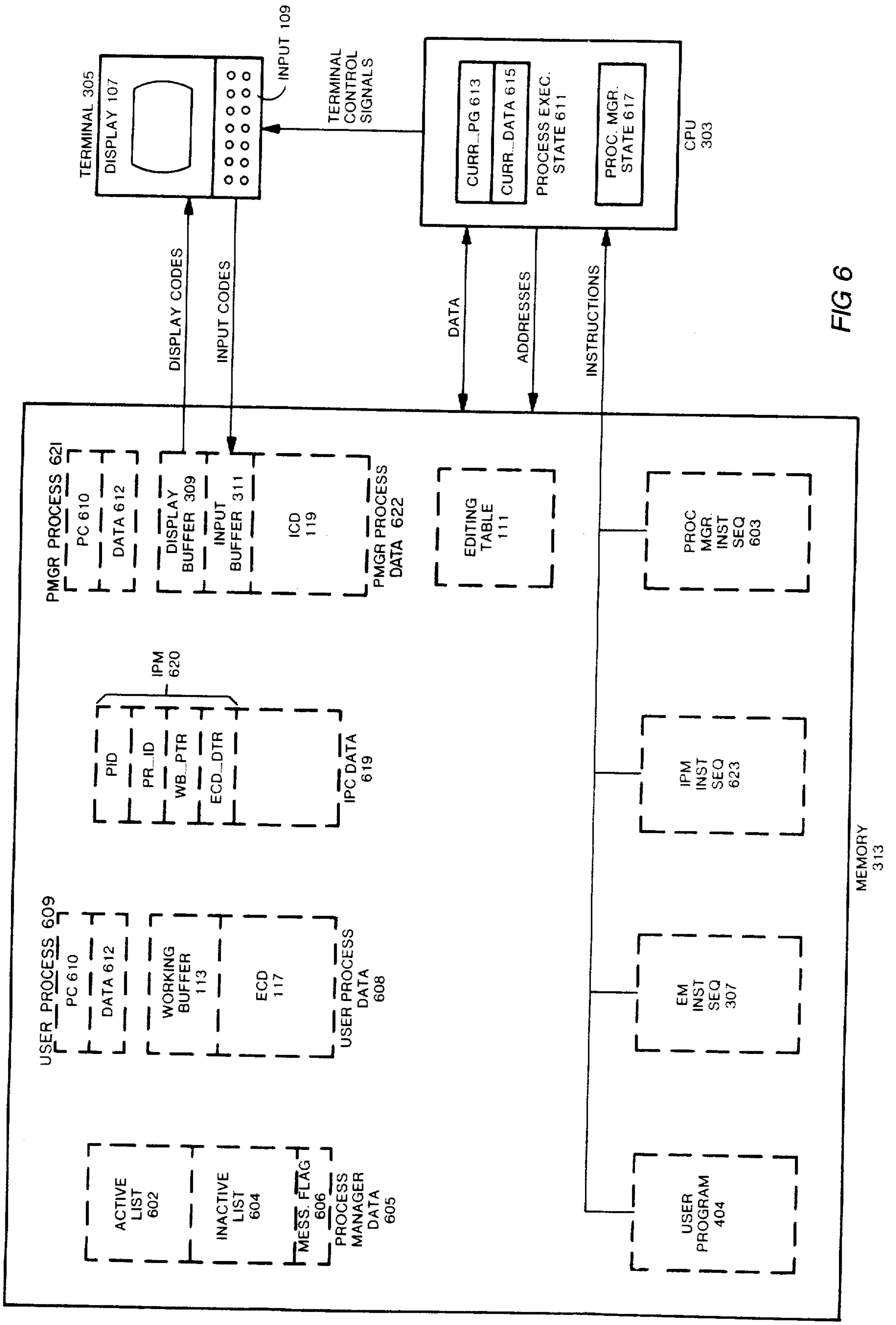
FIG. 6 is a block diagram of a fourth embodiment of the present invention in a multi-programming digital data processing system.

In digital data processing systems, finally, with "smart" terminals, each terminal contains its own processor and memory. The terminal processor then functions as Processor 105 and the terminal memory as Memory 103. An example of such an embodiment is shown in FIG. 6.

In the following, each of the above embodiments is described in detail. Embodiments of ED 101 in digital data processing systems other than those described above will be obvious to those skilled in the art.

4.1. ED 101 in a System having a Single CPU and a Single Memory—FIG. 3

Figure 3:
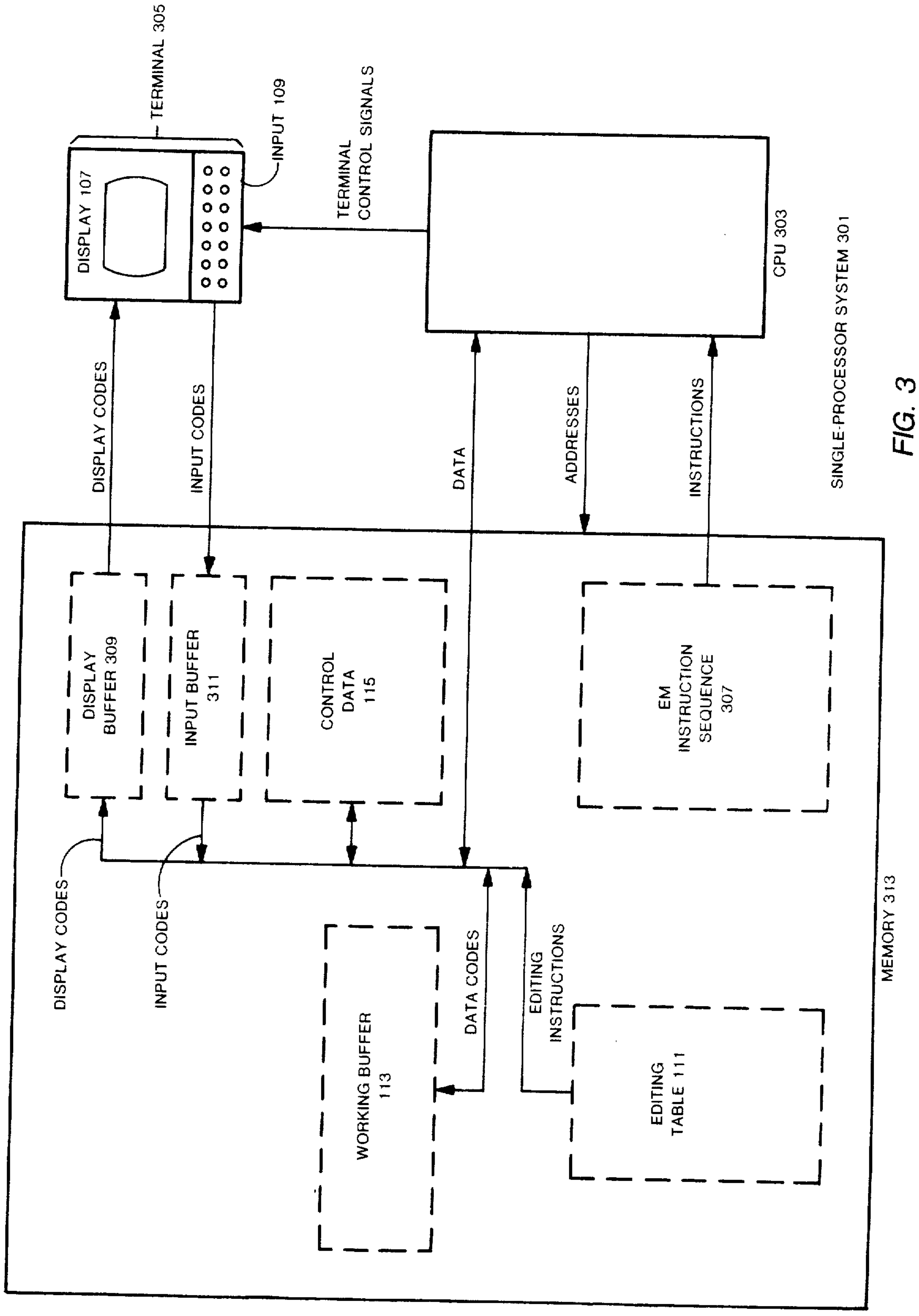
FIG. 3 is a block diagram of a first embodiment of the present invention in a digital data processing system with a single CPU.

FIG. 3 shows an embodiment of ED 101 in a digital data processing system having a single CPU 303. CPU 303 executes instructions stored in Memory 313. In response to these instructions, CPU 303 produces addresses of data and instructions in Memory 313, fetches data and instructions to CPU 303, and writes data to Memory 313. CPU 303 further generates control signals for Terminal 305, which responds to the control signals in two ways: Terminal 305 displays visual representations corresponding to the display codes in Display Buffer 309 in Memory 313, and it writes data input to Terminal 305 to Input Code Buffer 311. Taken together therefore, Display Buffer 309 and Terminal 305 are equivalent to Display 107, while Input Code Buffer 311 and Terminal 305 are equivalent to Input 109. Memory 313 further contains at least one Editing Table 111, Working Buffer 113 and Control Data 115. In addition, it contains ED Instruction Sequence 307. ED Instruction Sequence 307 is a sequence of instructions to which CPU 303 responds. When executing these instructions, CPU 303 responds to keystrokes from Terminal 305 in the manner described for Processor 105 in ED 101, and consequently, when CPU 303 is executing ED Instruction Sequence 307, Single-processor System 301 functions as an ED 101.

4.2. ED 101 in a System with an IOP—FIG. 4

Figure 4:
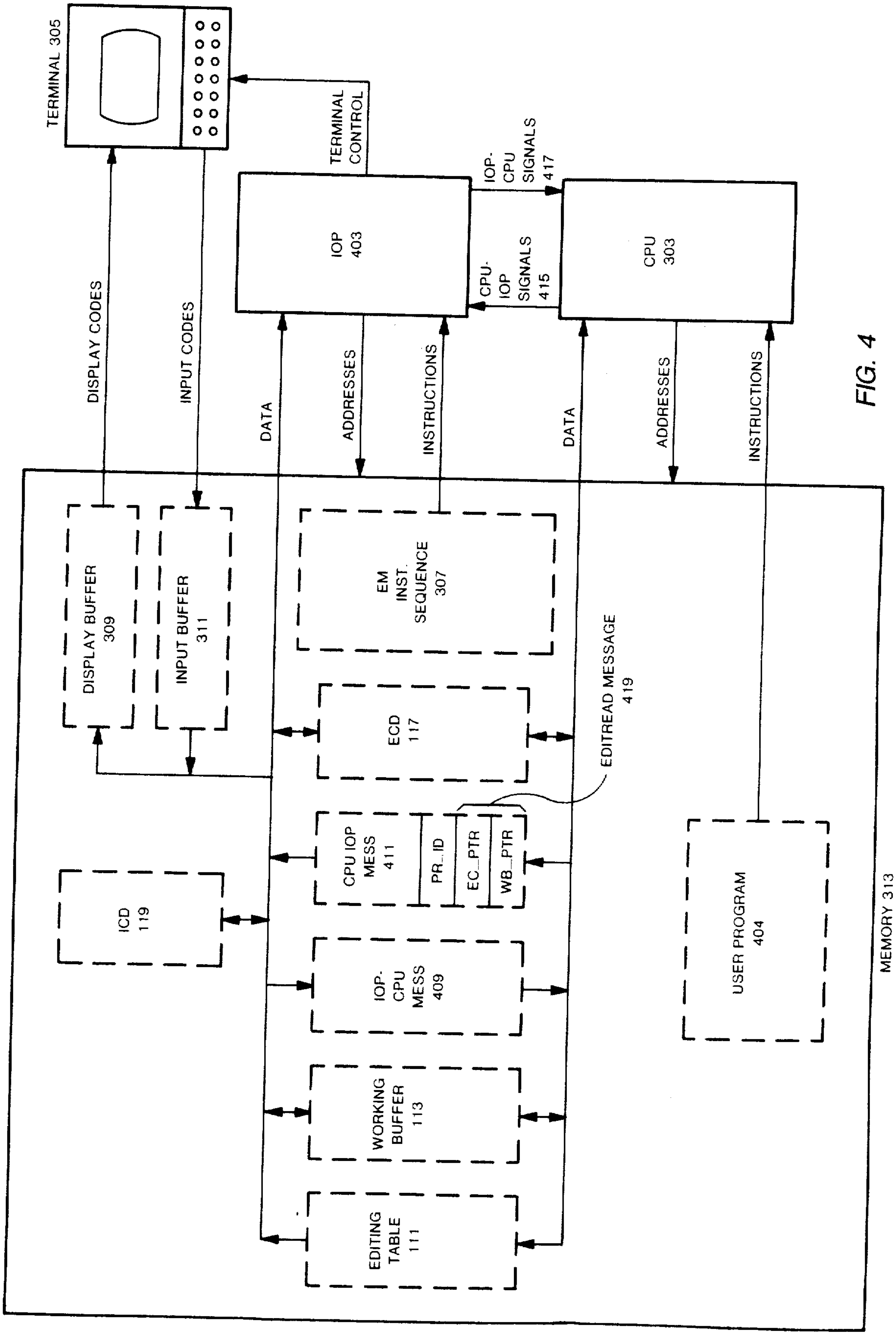
FIG. 4 is a block diagram of second embodiment of the present invention in a digital data processing system with a CPU and an Input-Output Processor.

FIG. 4 illustrates an embodiment of ED 101 in a Digital Data Processing System 401 with two processors, an IOP 403 and a CPU 303, sharing a single Memory 313. Both IOP 403 and CPU 303 execute instructions stored in Memory 313. CPU 303 and IOP 403 divide the tasks involved in executing a program. CPU 303 responds to its instructions by reading data from Memory 313, processing it, and returning it to Memory 313. IOP 403, on the other hand, controls devices such as Terminal 305 and responds to its instructions by transferring data between such devices and Memory 313.

IOP 403 and CPU 303 may coordinate their operations by means of signals between CPU 303 and IOP 403 and by means of areas in Memory 313 containing messages from CPU 303 to IOP 403 and vice-versa. In such a system, CPU 303 and IOP 403 cooperate to perform input/output operations as follows: when a User Program 404 executing on CPU 303 specifies an input-output operation, CPU 303 responds to the program by placing a message for IOP 403 in CPU-IOP Messages 411, signalling IOP 403 via CPU-IOP Signals 415, and suspending execution of the program which specified the input-output operation. The message in CPU-IOP Messages 411 specifies at least the operation which IOP 403 is to perform for CPU 303 and the locations in Memory 313 from or to which IOP 403 is transfer data. When IOP 403 receives the signal from CPU 303, it begins performing the operations specified in CPU-IOP Messages 411. When IOP 403 is finished, it puts a return message for CPU 303 in IOP-CPU Messages 409 and then signals CPU 303 via IOP-CPU Signals 417. CPU 303 responds by resuming execution of User Program 404 which specified the execution of the input-output operation.

When IOP 403 and Memory 313 are being used to implement ED 101, Memory 313 contains Working Buffer 113, Editing Table 111, Display Buffer 309, Input Buffer 311, ED Instruction Sequence 307, ICD 119, and ECD 117. As the arrows in FIG. 4 indicate, both CPU 303 and IOP 403 may read data from and write data to Working Buffer 113 and ECD 117. CPU 303 writes data to CPU-IOP Messages 411 and read it from IOP-CPU Messages 409. IOP 403 alone reads Editing Instruction Sequences 215 from Editing Table 111, reads and writes data to ICD 119, writes data to IOP-CPU Messages 409, uses Display Buffer 309 and Input Buffer 311, executes ED Instruction Sequence 307, and controls Terminal 305.

In an embodiment of ED 101 like the one just described, ED 101 may operate as follows: When User Program 404 executing on CPU 303 performs an operation involving ED 101, instructions in User Program 404 cause CPU 303 to place data to be modified by ED 101 in Working Buffer 113 and information controlling the modification in ECD 117. CPU 303 then places a message for IOP 403 in CPU-IOP Messages 411 and signals IOP 403. Message 419 contains at least three items: a program identifier (PR_ID) specifying that IOP 403 is to execute instructions in ED Instruction Sequence 307 and two pointers to the data to be used in the execution. The first pointer, EC_PTR contains the location of ECD 117 and the second, WB_PTR, contains the location of Working Buffer 113. In embodiments having more than one Editing Table 111, Message 419 may further contain ET_ID, specifying an Editing Table 111.

IOP 403 then responds to the signal from CPU 303 by executing ED Instruction Sequence 307 using Working Buffer 113, ECD 117, and Editing Table 111 specified in the message from CPU 303. The execution proceeds as previously described. When IOP 403 is finished executing ED Instruction Sequence 307, it places a message indicating that it is finished in IOP-CPU Messages 409 and signals CPU 303 via CPU Signals 417.

4.3. ED 101 in a "Smart" Terminal—FIG. 5

FIG. 5 presents an embodiment of of ED 101 in a "smart" terminal, that is, in a terminal which contains its own processor and memory. In systems with "smart terminals", there is a CPU 303 and a Memory 313, and CPU 303 is connected to one or more "Smart" Terminals 502. The connection between CPU 303 and a "Smart" Terminal 502" allows CPU 303 to send control signals and data to "Smart" Terminal 502 and to receive control signals and data from "Smart" Terminal 502. "Smart" Terminal 502 includes not only Display 107 and Input 109, but also Terminal Processor 503 and Terminal Memory 505. Terminal Processor 503 executes instructions stored in Terminal Memory 505. In response to these instructions, Terminal Processor 503 produces addresses of data and instructions in Terminal Memory 505, fetches data and instructions to Terminal Processor 503, writes data to Terminal Memory 505, obtains input codes from Input 109, and controls Display 107. In addition, Terminal Processor 503 responds to control signals from CPU 303, receives data from CPU 303, and provides data to CPU 303.

Computer System with a "Smart Terminal" 501 may operate as follows: When a User Program 404 executing on CPU 303 performs an operation requiring "Smart" Terminal 502, it may make a Terminal Message 513 containing a Program Identifier (PR_ID) identifying the operation to be executed by "Smart" Terminal 502 and the data to be used. Since the data will be worked on in Terminal Memory 505 instead of Memory 313, the data is identified by offsets from Terminal Message 513 instead of addresses in Memory 313. CPU 303 may then signal Terminal Processor 503 that data is coming and transmits Terminal Message 513 and data associated with it to Terminal Processor 503. The data is transmitted in an order corresponding to the offsets, and Terminal Processor 503 loads Terminal Message 513 and the data into Terminal Memory 505 beginning at a known location and in the order in which it is received. By adding the offsets to the location at which the Terminal Message 513 was loaded, Terminal Processor 503 can locate the contents of Terminal Message 513 in Terminal Memory 505. When Terminal Processor 503 has received all data specified in Termanal Message 513, it performs the operation specified by PR_ID in Terminal Message 513. When it is finished, it signals CPU 303 that data is coming and returns the data.

In embodiments of ED 101 in a in System with a "Smart" Terminal 501, Terminal Memory 505 may contain ED Instruction Sequence 307, Table 111, and ICD 119. User Program 404 executing on CPU 303 may then use ED 101 by preparing a Terminal Message 513 whose PR_ID specifies ED Instruction Sequence 307 and which contains offsets specifying locations of ECD 117 and Working Buffer 113 relative to Terminal Message 513. CPU 303 then transmits Terminal Message 513, Data for External Control 509, and Data to be Edited 507 to "Smart" Terminal 502. In Terminal Memory 505, Data for External Control is in the location specified in Terminal Message 513 for ECD 117 and Data to be Edited 507 is in the location specified in Terminal Message 513 for Working Buffer 113. "Smart" Terminal 502 then executes ED Instruction Sequence 307 using Data to be Edited 507 and Data for External Control 509 and returns that data to CPU 303 when it is finished.

As was the case with other embodiments of ED 101, some embodiments of ED 101 in "Smart" Terminals 502 may employ several Editing Tables 111. In such embodiments, ECD 117 may further contain ET_ID 125 specifying a specific Editing Table 111. Terminal Memory 505 may contain several Editing Tables 111 and the Editing Table 111 specified by ET_ID 125 may be one of those tables. If it is not, then Editing Table 111 specified by ET_ID 125 may be obtained from Memory 313. The mechanism for obtaining Editing Table 111 from Memory 313 may vary. In some cases, for example, in packet networks, where the cost of sending a single packet of data is the same regardless of whether the packet is full, CPU 303 may always send the Editing Table 111 specified by ET_ID 125 to "Smart" Terminal 502 along with Data to be Edited 507 and Data for External Control 509. In others, Memory 313 may contain a table specifying which Editing Tables 111 each "Smart" Terminal 502 has in its Terminal Memory 505 and provide an Editing Table 111 only if the table indicates that one is required. In still others, ED Instruction Sequence 307 may contain a sequence of instructions to which Terminal Processor 503 responds by requesting the proper Editing Table 111 from CPU 303 if it is not available in Terminal Memory 505.

Of course, digital data processing systems having IOPs 403 may also have "Smart" Terminals 502. In such systems, IOP 403 has the same relationship to a "Smart" Terminal 502 as CPU 330 in the system just described. The main difference between the systems is that IOP 403 may not produce Terminal Message 513, but may instead receive it from CPU 303 with which IOP 403 is associated.

4.4. Embodiments of ED 101 on Multiprogramming Systems

In the implementations of ED 101 dealt with up to this point, ED 101 has been implemented by means of physical processors and memories. However, in a multiprogramming digital data system, ED 101 may also be embodied by means of a process. In the following, multiprogramming systems and processes are described, and then an embodiment of ED 101 in a multiprogramming system.

4.4.1. Multiprogramming Digital Data Systems and Processes

A multiprogramming digital data system is a digital data system which apparently executes programs for different users simultaneously. In such systems, each user has the illusion that he alone has access to the CPU and the memory, even though he is in fact sharing the CPU and the memory with other user. A process is the means by which a multiprogramming digital data system executes a program for a user. Each process consists of an area of memory associated with an execution of a program for a user. The area of memory contains values required to execute the program on the CPU. These values include at least a value specifying the location of the next instruction to be executed in the program being executed for the user and a value specifying a location in memory at which data currently being used in the execution of the program is stored. A multiprogramming digital data processing system may further contain a program called the process manager to which the CPU responds by loading values required to execute a given process from the area of memory belonging to the process into the CPU. Once the values are loaded, the CPU begins to execute the program for the user at the location specified in the process's area of memory. As execution continues, the value specifying the location of the next instruction to be executed and the value specifying the location in memory currently being used to store data change. After execution has continued for awhile, a process interrupt may occur, either because the process has run for the maximum amount of time allowed it for a single turn on the CPU or because the program the process is executing has performed an operation such as an I/O operation for which it must await the results. On such a process interrupt, the CPU may automatically execute process manager instructions, and these instructions unload the process from the CPU, that is, they return the value for the location currently being used to store data and the value for the current location of the next instruction to be executed to the process's area in memory. Process manager instructions then load equivalent values from another process's memory area into the CPU and that process's program is executed as just described. Thus, each process in turn may gain access to the CPU, and while it has access, the execution of its program progresses. Since many processes may have turns on the CPU over a short period of time, the CPU seems to users of the system to be executing a number of programs simultaneously.

Processes may communicate with each other by means of Interprocess Messages (IPMs). These may resemble the messages between physical processors already described. When one process wishes another process to perform an operation for it, the first process may make an IPM specifying the operation and the data it is to be performed on for the second process and may indicate to the process manager that the second process has an IPM. The process manager then removes the first process from the CPU and from the set of processes which may have access to the CPU and adds the second process to the set of processes which may have access to the CPU. When the second process is loaded onto the CPU, it performs the operation specified in the message. When it is finished, it sends a return IPM to the first process indicating that the operation is finished, and on the receipt of the IPM, the process manager again allows the first process to have access to the CPU.

Processes may have specialized functions; for example, one process may manage all input-output devices. Such a process is sometimes termed a Peripherals Manager (PMGR) process. Other processes wishing to use these devices send IPMs to the PMGR process, which then executes programs which cause the input-output devices under its control to perform the operations specified in the IPMs on the data specified in the IPMs.

Processes may also exist on digital data processing systems with more than one processing unit. For example, in a digital data processing system with several CPUs, each CPU may be executing a different process. In a digital data processing system with an IOP, a PMGR process described above may execute solely on an IOP, and in a digital data processing system with "smart" terminals, each terminal may be treated as a separate process. In such systems, Terminal Message 513 may be equivalent to an IPM.

4.4.2. ED 101 in a PMGR Process—FIG. 6

Since the relationship between processes is the same regardless of a process's function or which processing unit it executes on, the only embodiment of ED 101 on a multiprogramming digital data processing system explored in detail herein is one in which ED Instruction Sequence 307 is executed by a PMGR process. Such an embodiment is a logical consequence of the fact that the PMGR process controls terminals.

FIG. 6 is a representation of an ED 101 embodied in a Multi-programming System 601 having a PMGR process. Multi-programming System 601 comprises Memory 313, CPU 303, and at least one Terminal 305. Memory 313 in a multi-programming system may contain Process Manager Instruction Sequence 603, which contains instructions executed by CPU 303 in order to store one process and load another, and Process Manager State 605, which contains data used during the execution of Process Manager Instruction Sequence 603 to determine which process is to be loaded onto CPU 303. Data in Process Manage State 605 may include an Active List 602 indicating which processes may be currently loaded onto CPU 303, an Inactive List 604, indicating which processes may not be currently loaded onto CPU 303, and a Message Flag 606, indicating whether an IPM has been sent. Memory 303 further contains instruction sequences executed by processes and the processes themselves. Instruction sequences are represented in FIG. 6 by User Program 404, ED Instruction Sequence 307, and IPM Instruction Sequence 623. IPM Instruction Sequence 623 is executed by every process which sends an IPM. Processes are represented by User Process 609 and PMGR Process 621. Each Process contains at least PC 610, specifying the next instruction to be executed by the process when it is loaded into CPU 303, and DATA 612, specifying the location of the data currently being used. User Process Data 608 indicates data specified by DATA 612 for User Process 609, and PMGR Process Data 622 indicates data specified by DATA 612 for PMGR Process 621.

Registers in CPU 303 contain Process Execution State 611 for the process currently being executed and Process Manager State 617 for the Process Manager. At a minimum, Process Execution State 611 contains CUR_PC 613, which is the location of the instruction currently being executed and CUR_DATA 615, which is the location which the process currently being executed is using for data. Process Manager State 617 contains information which allows CPU 303 to automatically execute Process Manager Instruction Sequence 603 whenever the execution of the process whose CUR_PC value and CUR_DATA value are currently loaded into Process Execution State 611 is interrupted.

In FIG. 6, User Process 609 has just executed instructions in User Program 404 which have set up Working Buffer 113 and ECD 117 for ED 101 in User Process Data 608. Since ED 101 is executed by PMGR Process 621, User Process 609 has also executed IPM Instruction Sequence 623 to create IPM 620 in IPC Data 619 and to set Message Flag 606 in Process Manager Data 605 to indicate that a message has been sent. IPM 620 contains at least WB_PTR, specifying the location of Working Buffer 113 in User Process Data 608, EC_PTR, specifying the location of ECD 117 in User Process Data 608, a process identifier (PID) specifying the process for which the message is intended, in this case, PMGR Process 621, and PR_ID, identifying the program, in this case, ED Instruction Sequence 307, to be executed by PMGR Process 621.

Since a process sending an IPM cannot proceed until it has received an answer, IPM Instruction Sequence 623 contains instructions which produce an interrupt and cause CPU 303 to execute Process Manager Instruction Sequence 603, which in turn removes User Process 609 from CPU 303 by storing the values of CURR_DATA 615 and CURR_PC 613 in DATA 612 and PC 610 respectively of User Process 609 and setting Inactive List 604 to indicate that User Process 609 is currently inactive.

Each time Process Manager Instruction Sequence 603 executes, it checks message flag 606 to determine whether messages has been added to IPC Data 609. If any has been, Process Manager Instruction Sequence 603 examines IPC Data 619 for new IPMs 620 and adds the processes specified as the recipients of the IPMs, including in this case PMGR Process 621, to Active List 602. When an execution of Process Manager Instruction Sequence 603 results in PMGR Process 621 having access to CPU 303, PMGR Process 621 checks for an IPM in IPM Data 619. If PMGR Process 621 finds one, it begins executing the instruction sequence specified in the IPM on the data specified in the IPM. In this case, the IPM is IPM 620, which specifies ED Instruction Sequence 307, Working Buffer 113 in User Process 609, and ECD 117 in that process.

When CPU 303 begins executing ED Instruction Sequence 307, it adds storage for ICD 119, Display Buffer 309, and Input Buffer 311 to PMGR Process Data 622. Using this storage together with Working Buffer 113, External Control Data 413, and Editing Table 111 specified by ET_ID 125 in ECD 117, PMGR Process 621 responds to input codes from Terminal 305 in the manner previously described for ED 101. When PMGR Process 621 has finished executing ED Instruction Sequence 307, it sends an IPM to User Process 609 in the manner previously described.

5. Detailed Description of a Present Embodiment—FIG. 7

In a present embodiment, ED 101 is implemented on a multiprogramming digital computer system with a single CPU 303. In this system, ED 101 in the present embodiment is executed by a User Process 609 instead of by PMGR Process 621. Consequently, instruction sequences executed by User Process 609 need not send an IPM 620 to perform an operation involving ED 101, but instead may simply execute ED Instruction Sequence 307 like any other sequence of instructions.

Figure 7:
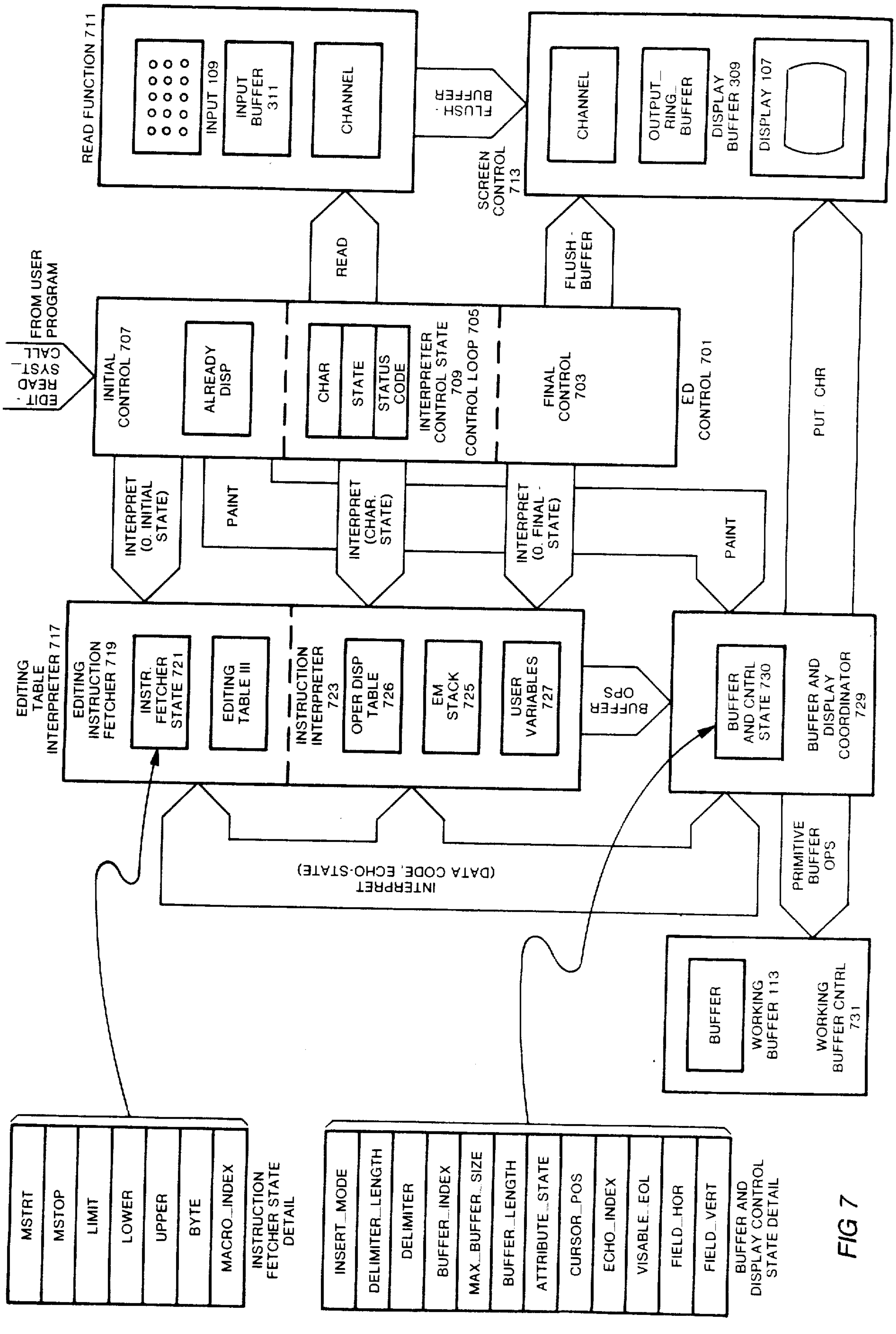
FIG. 7 is a functional block diagram of the procedure EDITREAD_SYS_CALL in an embodiment of the present invention.

ED Instruction Sequence 307 in this embodiment is a sequence of instructions for CPU 303 produced by a PL/I compiler from a source program written in the PL/I programming language. Appendix A contains a copy of this source program, entitled EDITREAD_SYS_CALL, and following EDITREAD_SYS_CALL, a copy of data declarations used in the source program. The data declarations carry the titles EXTENDED_READ, PACKET, and TERMINAL_DATA. The remainder of the data declarations define names representing constant values and are not material to the present discussion. FIG. 7 is a block diagram of the parts of EDITREAD_SYS_CALL showing how the parts relate to each other and to the components of ED 101 contained in Memory 313. The parts and an overview of the operation of this embodiment of ED 101 will be presented using Appendix A and FIG. 7. Having read the overview, those skilled in the art may determine the detailed operation of this embodiment by studying the source text of EDITREAD_SYS_CALL in Appendix A.

Beginning with the components of ED 101 contained in Memory 313, these components are referred to by means of variable names in EDITREAD_SYS_CALL. These variables are declared in EDITREAD_SYS_CALL itself and in the data declarations following EDITREAD_SYS_CALL in Appendix A. Turning first to the data declarations, these declarations fall into three groups: declarations for Editing Table 111 and locations therein under the title EXTENDED_READ, declarations for data which controls ED 101, under the title PACKET, and declarations for data which ED 101 requires to control Display 107, under the title TERMINAL_DATA.

5.1. Declarations for Editing Table 111

Turning first to data declarations under the title EXTENDED_READ, on page 2 of the data declarations, there may be seen data declarations for Editing Tables 111. The first data declaration, CHANNEL_DATA_ADDRESS, is a pointer to Editing Table 111, and thus corresponds to ET_ID 116 of ED 101. CHANNEL_DATA_ADDRESS has the PL/I static external attribute, and will therefore be placed in an area in Memory 313 available to all PL/I programs executed by User Process 609. The remaining declarations are for Editing Table 111 itself and for variables specifying locations in a given Editing Table 111. In those declarations, MACRO_TABLE corresponds to Initial Sequence 205, Final Sequence 207, Display Sequences 209, and Buffer Editing Sequences 211, and DISPATCH_TABLE corresponds to Dispatch Table 203.

CHANNEL_DATA, finally, includes Locator Information 201 and other locations in Editing Table 111. The variables in Locator Information 201 are the following:

initial_macro_size specifies the number of bytes in Initial Sequence 205;

final_macro_size specifies the number of bytes in Final Sequence 207;

echo_macro_start specifies the offset in bytes of Display Sequences 209 from Initial Sequence 205;

echo_macro_size specifies the size in bytes of Display Sequences 209;

macro_table_size specifies the size in bytes of Buffer Editing Sequences 211;

number_states specifies the number of values State 116 may have and therefore the number of Buffer Editing Sequences 211 in Editing Table 111.

The remaining variables specify locations in a given Editing Table 111:

macro_table_address is a pointer to the beginning of Initial Sequence 205;

dispatch_table_address is a pointer to the beginning of Dispatch Table 203.

As is apparent from the descriptions of these variables, the locations of the beginnings of Initial Sequence 205, Final Sequence 207, Display Sequences 209, and Buffer Editing Sequences 211 may be calculated using these variables.

5.2. Declarations for ECD 117 and ICD 119

Turning now to PACKET, on page 3 of the data declarations, there may be seen declarations for data passed to ED 101 on execution of ED Instruction Sequence 307. In this embodiment, the information contained in the packet corresponds to portions of ECD 117 and ICD 119. The parts of the packet which are of interest for the present discussion are the following:

channel is a value which specifies Input 109 from which ED 101 is to receive input codes and Display 107 to which ED 101 is to output display codes.

BUFFER_ADDRESS is a pointer to the location of Working Buffer 113 in Memory 313.

USER_ARRAY_ADDRESS is a pointer to a location in Memory 313 containing an array of variables which ED 101 may read or modify in response to Editing Instructions 225. Different Editing Tables 111 may use these variables for different purposes. USER_ARRAY_SIZE specifies the size of this array.

Editing Instruction Sequences 215 in Editing Table 211 may explicitly specify that the next group of variables, marked by the comment, /* R/W vars start here */, be read or modified during execution of the Editing Instruction Sequence 215 by ED 101. These variables have the following meanings:

V0 is a general-purpose variable.

insert_mode's value determines the manner in which the results of an insert operation are displayed on Display 107.

delimiter_length specifies whether the delimiter code is made up of one or two input codes.

delimiter contains one or two input codes which specify a delimiter for a given execution of ED 101.

state corresponds to State 121.

status_code is used to return error status codes to programs using interpreter 101.

buffer_index corresponds to B_I 123.

max_buffer_size specifies the maximum size of Working Buffer 113.

Editing Instruction Sequences 215 may not explicitly specify the modification of the remaining variables, but the variables may change their values as a consequence of an execution of an Editing Instruction Sequence 215.

field_size specifies the size of the field in Display 107 in which the visual representations corresponding to the contents of Working Buffer 113 are to be displayed on Display 107.

already_displayed indicates whether the contents of Working Buffer 113 have already been displayed on Display 107.

attribute_state specifies what display attributes representations being displayed on Display 107 have. Examples of display attributes are underscored representations, dim representations, bright representations, or colored representations.

buffer_length specifies the number of data codes currently contained in Working Buffer 113.

cursor_pos is equivalent to CP 126.

char contains the input code received from Input 109.

echo_index is the index on Display 107 of the representation currently being displayed.

The next group of variables serve to locate representations of data on Display 107. Locations on Display 107 are defined in terms of horizontal lines and vertical columns.

visible_eol indicates a column in which a line being currently displayed on Display 107 ends.

field_vert specifies a line making up a display field on Display 107;

field_horizontal specifies the column at which the display field begins on Display 107.

PACKET_OVERLAY2 is a variable which occupies the same location in Memory 113 as PACKET, but which allows the contents of PACKET to be referenced as array elements. OPERATOR_DISPATCH_TABLE, finally, is an array which is used to translate codes contained in Editing Instruction Bytes 225 into case values which determine how EDITREAD_SYS_CALL responds to the codes. The values assigned to the elements of OPERATOR_DISPATCH_TABLE in the declaration remain unchanged throughout the operation of EDITREAD_SYS_CALL.

5.3. Declarations for Display 107

Turning finally to page 8 of the declarations, titled TERMINAL_DATA, this data is used by EDITREAD_SYS_CALL to control Display 107;

LPP and CPL specify the number of lines per page and columns per line which are available to Display 107;

CURSOR_TYPE specifies the type of cursor which terminals supporting more than one cursor type should employ;

CURRENT_ROW and CURRENT_COL specify the current row and column positions of the cursor on Display 107.

5.4. Declarations for ICD 119 in EDITREAD SYS CALL

The remainder of ICD 119 is specified in data declarations in EDITREAD_SYS_CALL and in PL/I procedures contained therein. Variables declared in PL/I procedures are allocated storage on a PL/I stack in Memory 313 each time the procedure in which the variable is declared is invoked and the storage is accessible by means of a reference to the variable only during the life of the invocation. Since an invocation of the EDITREAD_SYS_CALL procedure itself lasts throughout the operation of ED 101, variables declared in that procedure are available throughout the operation of ED 101. Of these variables, only four groups are of interest to the present discussion.

Variables for Working Buffer 113 and Display Buffer 309

The first group, declared on page 2 of EDITREAD_SYS_CALL defines variables by means of which Working Buffer 113, the array of user variables, and Display Buffer 309 may be accessed. The storage for these variables is defined in terms of pointers received in the packet used to invoke EDITREAD_SYS_CALL, and consequently, the variable represents the area of Memory 313 specified by the pointer. Thus, the variable buffer is defined as the storage at the location specified by the pointer buffer_ptr, which contains the location of Working Buffer 113, and buffer therefore represents Working Buffer 113 in EDITREAD_SYS_CALL. Similarly, the variable user_array is defined as the storage at the location specified by the pointer USER_ARRAY_ADDRESS, and consequently, the elements of user_array represent those variables. OUTPUT_RING_BUFFER, finally, holds codes for visual representations to be output to Display 107. It thus corresponds to Display Buffer 309.

Variables for this Embodiment's Internal Stack

The second group forms a LIFO (last in-first out) data structure which this embodiment of ED 101 uses to store and retrieve data while it is interpreting Editing Instruction Bytes 225. This data structure, termed herein the interpreter stack, is represented in EDITREAD_SYS_CALL by the variable stack, declared on page 2. ED 101 can always access three items of data stored in stack:

- stack_prev, the item of data in the stack which procedes the item currently at the top of the stack;
- stack_top, the item of data currently at the top of the stack;
- stack_next, the item of data into which the next value to be stored on the stack will be stored.

As may be seen from the declarations, the locations of these variables are defined in terms of a pointer variable, stack_ptr. Thus, by changing the value of stack_ptr, the locations in stack referenced by these variables may be changed. The value of stack_ptr is changed each time data is added to or taken from stack. When data is added to stack, stack_ptr is incremented by one, so that stack_top represents the value just added and stack_prev the value previously represented by stack_top. When data is removed, stack_ptr is decremented by one, so that stack_top represents the value formerly represented by stack_prev.

Variables Controlling Fetching of Editing Instruction Bytes 225

The third group, declared in the procedure INTERPRET on page 4 of EDITREAD_SYS_CALL, consists of variables used in locating Editing Instruction Sequences 215 and controlling the fetching of Editing Instruction Bytes 225 from Editing Table 111.

- mstrt contains the location of the start of Editing Instruction Bytes 225 in Editing Instruction Sequence 215 currently being executed.
- mstop contains the location of the end of Editing Instruction Bytes 225 in Editing Instruction Sequence 215 currently being executed.
- limit contains the location of the end of Buffer Editing Sequence 211 containing Editing Instruction Sequence 215 currently being executed.
- lower contains LV 219 from Editing Instruction Sequence 215 currently being executed.
- upper contains UV 221 from Editing Instruction Sequence 215 currently being executed.
- macro_index contains the index in Editing Instruction Sequence 215 of the byte currently being interpreted.
- byte contains the value of the byte currently being interpreted.

5.5. Description of EDITREAD SYS CALL—FIG. 7

Turning now to FIG. 7, FIG. 7 is a block diagram showing the parts of EDITREAD_SYS_CALL, the relationship between the parts of EDITREAD_SYS_CALL and other components of ED 101, the the flow of data and control between the parts of EDITREAD_SYS_CALL and between EDITREAD_SYS_CALL and other components of ED 101. Each block in FIG. 7 represents a major part of EDITREAD_SYS_CALL. Each part consists of one or more PL/I procedures contained in EDITREAD_SYS_CALL. A broad arrow from one block to another indicates that at least some of the PL/I procedures represented by the block which is the source of the arrow call procedures represented by the block which is the destination of the arrow. In PL/I a procedure may be invoked recursively, that is, by itself or by another procedure which it has invoked. Consequently, some arrows in FIG. 7 indicate that a procedure in a block invokes itself. Inside each block are boxes indicating which parts of Editread 101's components in Memory 103 are used by a block. In the case of Control Data 115, each block uses different variables in Control Data 115, and consequently, only the names used to refer to the variables in EDITREAD_SYS_CALL are indicated in FIG. 7; in the cases of the other components, both the name of the Editread 101 component and the variable name corresponding to the component in EDITREAD_SYS_CALL are indicated.

The following discussion first summarizes the functions of the blocks and then discusses each block in greater detail.

- ED Control 701 controls the execution of ED 101.
- Read Function 711 reads input codes from Input 109.
- Editing Table Interpreter 717 locates Editing Instruction Sequences 215 corresponding to an input code or a data code and a value of State 121 and interprets the Editing Instruction Bytes 225 in the Editing Instruction Sequence 215 so located.
- Buffer and Display Coordinator 729 coordinates operations on Working Buffer 113 and the display of the results of the operation on Display 107.
- Screen Control 713 controls the operation of Display 107.
- Working Buffer Control 731 controls the manipulation of data codes in Working Buffer 103.

5.5.1. ED Control 701

ED Control 701 corresponds to the main procedure EDITREAD_SYS_CALL. In this embodiment, operation of ED 101 commences with invocation of this procedure by a program using ED 101. The parts of ED Control 701 correspond to its function: Initial Control 707 performs operations involved in initiating the operation of ED 101, Control Loop 705 is a loop which causes ED 101 to keep fetching input codes from Input 109 until a delimiter code is received, and Final Control 703 performs operations involved in terminating the operation of ED 101. Variables whose values are set or read by ED Control 701 are indicated in ED Control State 705.

Operation of ED Control 701 commences when a user program using ED 101 invokes EDITREAD_SYS_CALL with a pointer to the packet of data defined in the variable PACKET. The PL/I code for ED Control 701 may be found on pages 3 through 5 of EDITREAD_SYS_CALL. Lines 370 through 413 contain the code for Initial Control 707, lines 422 through 427 contain the code for Control Loop 705, and lines 432 through 445 the code for Final Control 703.

5.5.2. Read Function 711

The block labelled Read Function 711 corresponds to the function read, on page 21 of EDITREAD_SYS_CALL. When this function is invoked by Control Loop 705, it fetches an input code from Input 109 and returns the input code to Control Loop 705. In this embodiment, an input code is fetched by means of a call to CPU 303's operating system. The operating system automatically associates an input buffer with a channel number and an input device, and the system call BINARY_READ_STRING fetches a byte from the input buffer associated with the channel. Thus, in the read function, the variable channel, obtained from the packet used to invoke EDITREAD_SYS_CALL, specifies Input 109 and Input Buffer 311 from which the read function is to fetch an input code.

Before calling BINARY_READ_STRING to obtain the character, read calls flush_buffer, explained below, to cause Display 107 to display visual representations corresponding to display codes contained in Display Buffer 309. Then, after obtaining the byte from Input Buffer 311, the read function puts it into a proper format for ED 101 and returns it to Control Loop 705.

Screen Control 713

Screen Control 713 manages Display Buffer 309, corresponding to the variable OUTPUT_RING_BUFFER, and by means of display codes contained in that buffer, Display 107. Two PL/I procedures put_chr and flush_buffer, both on page 22 of EDITREAD_SYS_CALL, perform the management. put_chr puts display codes into OUTPUT_RING_BUFFER, and flush_buffer uses the system call BINARY_WRITE_STRING to output the contents of OUTPUT_RING_BUFFER to Display 107 and empty the buffer. A component of BINARY_WRITE_STRING translates the contents of OUTPUT_RING_BUFFER into visual representations suitable for the specific Display 107 being used.

5.5.3. Editing Table Interpreter 717

Editing Table Interpreter 717 locates an Editing Instruction Sequence 215 corresponding to an input code or data code value and a value specifying a set of Editing Instruction Sequences 215 and then performs operations specified by individual bytes of Editing Instruction Bytes 225. Editing Table Interpreter 717 is made up of the single INTERPRET procedure, on pages 4 through 12 of EDITREAD_SYS_CALL. An invocation of INTERPRET requires two pieces of data: an input code or a data code to be interpreted and a value specifying a portion of Editing Table 111. That value may be provided by State 121, or it may be a constant value.

As may be seen by the arrows in FIG. 7, INTERPRET is invoked by all three subsecutions of ED Control 701, Buffer and Display Coordinator 729, and recursively by itself. INTERPET is the only component of EDITREAD_SYS_CALL which reads Editing Table 111. Editing Table Interpreter 717 has two main subdivisions: Editing Instruction Fetcher 719 and Editing Instruction Interpreter 723.

Editing Instruction Fetcher 719

Editing Instruction Fetcher 719, on pages 4 and 5 of EDITREAD_SYS_CALL, first locates a set of Editing Instruction Sequences 215 in Editing Table 111 corresponding to the value provided for the invocation of INTERPRET and then locates an individual Editing Instruction Sequence 215 corresponding to the input code or data code value. Having located an Editing Instruction Sequence 215, Editing Instruction Fetcher 719 provides Editing Instruction Bytes 225 of Editing Instruction Sequence 215 one byte at a time to Instruction Interpreter 723. The manner in which Editing Instruction Fetcher 719 reads Editing Table 119 is controlled by Editing Instruction Fetcher State 721. As may be seen from FIG. 7, this state consists of values sent to ED 101 in the packet CHANNEL_DATA and values used in INTERPRET to control instruction fetching.

Instruction Interpreter 723

Instruction Interpreter 723 consists primarily of a large DO CASE statement (pages 5 through 11 of EDITREAD_SYS_CALL). A DO CASE statement is a compound statement which includes groups of statements called cases. When a DO CASE statement is executed, the value of an expression specified in the DO CASE statement determines which of the cases is executed. In this DO CASE statement, the binary value of the byte provided by Editing Instruction Fetcher 719 is used as an index into Operator Dispatch Table 726. The value at that location in Operator Dispatch Table 726 then determines which group of statements in the DO CASE statement is executed. For example, if the value in Operator Dispatch Table 726, is 1, the statements on line 518 are executed. When Instruction Interpreter 723 has finished executing statements in a case, Editing Instruction Fetcher 719 provides a next byte from Editing Instruction Bytes 225.

The manner in which Editing Instruction Interpreter 723 interprets Editing Instruction Bytes 225 depends on the arrangement of Editing Instruction Bytes 225 in Editing Table 111. As previously mentioned, in this embodiment, Editing Instruction Bytes 225 for a single operation consist of operand bytes followed by an operation code byte. The values of the operand bytes specify that they represent operands and also specify whether the operand byte is a literal or specifies a variable. The variable may be one of the variables in User Variable Array 727 or one of the variables declared on lines 10 through 35 of PACKET. Editing Instruction Intepreter 723 uses Interpreter Stack 725 to store operand values until it interprets the operation code byte. When an operand byte is a literal, Editing Instruction Interpreter 723 places the operand's value on Interpreter Stack 725; when it is a variable, it locates the variable in Control Data 115 and places the variable's value on Interpreter Stack 725. When an operation code byte is interpreted, Editing Instruction Interpreter 723 obtains the operands from Interpreter Stack 725 and performs the operation specified by the operation code byte on them. As may be seen by the arrows, Editing Instruction Interpreter 723 can invoke routines in Buffer and Display Coordinator 729 and can invoke the INTERPRET procedure recursively.

5.5.4. Working Buffer Control 731

Working Buffer Control 731 manipulates Working Buffer 113. Working Buffer Control 731 includes the procedures true_buff, insert_true_buff, is_attribute_state_marker, and true_index. The procedures may be found on Pages 24 and 25 of EDITREAD_SYS_CALL. true_buff fetches a data code from Working Buffer 113, insert_true_buff inserts a data code into Working Buffer 113, and replace_true_buff replaces one data code in Working Buffer 113 with another. The other procedures provide information about Working Buffer 113 required to manage Working Buffer 113. As shown by the arrows, only Buffer and Display Coordinator 729 invokes procedures in Working Buffer Control 731.

5.5.5. Buffer and Display Coordinator 729

The remaining procedures contained in EDITREAD_SYS_CALL are parts of Buffer and Display Coordinator 729. Buffer and Display Coordinator 729 coordinates modifications of Working Buffer 113 and the output of display codes to Display Buffer 309 so that Display Buffer 309 always reflects the most recent modification of Working Buffer 113. Buffer and Display Control State 730 contains data used by Buffer and Display Coordinator 729 to coordinate its operations.

Most of the PL/I procedures in Buffer and Display Coordinator 729 are invoked only by other procedures in that component. For present purposes, an understanding is required of only those procedures in Buffer and Display Coordinator 729 which are invoked by other components of EDITREAD_SYS_CALL. These procedures fall into two groups: those which modify only Display 107 and those which modify both Working Buffer 113 and Display 107. First, the procedures which modify only Display 107:

echo_binary and echo, on pages 22 and 23 of EDITREAD_SYS_CALL. These procedures invoke put_chr to output a single display code to Display Buffer 309 and modify Buffer and Display Control State 730 as required.

paint and paint_and_restore_state, on pages 16 and 17. These procedures cause Display 107 to display a range of visual representations corresponding to a range of data codes in Working Buffer 113.

paint and paint_and_restore_state work by invoking true_buff to obtain each data code in the range of data codes and then invoking INTERPET using the data code and a value specifying Display Sequences 209 in Editing Table 111. In the case of printable data codes, INTERPET then invokes echo with a displayncode corresponding to the data code and echo invokes put_chr as described above, thus causing a display code corresponding to the data code to be added to Display Buffer 309.

The remaining procedures perform operations on Working Buffer 113 and cause the result of the operation to be displayed on Display 107.

MOVE, on pages 13 and 14, carries out the move operation. It updates buffer_index in Buffer and Display Control State 730, invokes the procedure paint to cause Display 107 to display the representations of the data codes affected by the move, and invokes other procedures to reset attributes and output the cursor at the new cursor position. The procedure which outputs the cursor uses put_chr with a special cursor control code to actually put the cursor into Display Buffer 309.

DELETE, on page 14, deletes one or more data codes from Working Buffer 113. On a delete of characters to the left of a current cursor position, DELETE updates buffer_index and establishes a new cursor position before deleting the data codes; on a delete of characters to the right of a current cursor position, this step is not necessary. After deleting data codes, DELETE updates buffer_length and invokes the paint procedure to redisplay the entire contents of Working Buffer 113.

INSERT, on pages 13 and 14, inserts a data code in Working Buffer 113, updates buffer_index and buffer_length, and then invokes the paint procedure to display the altered portion of Working Buffer 113 and the procedures mentioned above to put a cursor into the proper location.

SEARCH, on pages 15 and 16, locates a data code in Working Buffer 113 which matches a data code provided as an argument to the procedure. SEARCH searches to the left or right, as specified by another argument. If it finds a matching data code, it invokes MOVE to update buffer_index so that it specifies the location of the matching data code and to display representations of the affected portions of Working Buffer 113 on Display 107, as previously described.

6. Operation of a Present Embodiment of ED 101

Having thus provided an overview of the parts of a present embodiment of ED 101, the discussion turns to a description of the operation of this embodiment using a specific Editing Table 111. The discussion first presents a specific Editing Table 111 and then describes how ED 101 uses that Editing Table 111 to execute an initial operation and a search operation and to respond to a delimiter code.

6.1. Detailed Description of a Specific Editing Table 111

Editing Tables 111 for this embodiment of ED 101 are produced by a compiler from a source text of ASCII characters. When a user of Digital Computer System 127 wishes to make a new Editing Table 111, he writes a source text and then uses the compiler to produce an Editing Table 111 corresponding to the source text. A source text for an Editing Table 101 entitled DEFAULT_TABLE, may be found in Appendix B. A hexadecimal representation of Default Table 801, an editing table produced by the compiler from DEFAULT_TABLE, is presented in FIG. 8. The discussion first explains how one skilled in the art may read DEFAULT_TABLE and then shows how Default Table 801 relates to DEFAULT_TABLE.

6.1.1. The Source Text DEFAULT TABLE

Turning first to Appendix B, the actual source text for Default Table 801 begins on line 46. The words INITIAL MACRO indicate that the part of DEFAUL- T-TABLE which follows corresponds to Initial Sequence 205 for Default Table 801. The text enclosed in square brackets is a programming language used to produce Editing Tables 111. The text specifies Editing Instruction Bytes 225 in the Editing Instruction Sequence 215 contained in Initial Sequence 205. Similarly, FINAL MACRO on line 47 indicates that the following text (in this case, none), specifies Editing Instruction Bytes 225 for Final Sequence 207, ECHO MACROS on line 49 indicates the beginning of Editing Instruction Sequences 215 for Display Sequences 209, and STATE=0 indicates the first Buffer Editing Sequence 213, STATE=1 the next, and so on through STATE=6.

As previously explained, in Display Sequences 209 and Buffer Editing Sequences 211, each Editing Instruction Sequence 215 contains the values LV 219 and UV 221, which together specify the range of values of the data codes for which Editing Instruction Sequence 215 is valid. These values are indicated in DEFAULT_TABLE by two hexadecimal values preceding the text in square brackets. Thus, on line 50, 20,7F indicates that LV 219 will have the hexadecimal value 20 (decimal 32) and UV 221 the hexidecimal value 7F (decimal 127). The data codes used in this embodiment are ASCII codes and the ASCII codes in the range specified 20 and 7F are the codes for the printable characters. Thus, the text in square brackets on line 50 specifies actions to be performed by ED 101 in response to a printable ASCII character.

Having thus provided an overview of DEFAULT_TABLE, the discussion now proceeds to provide enough detail concerning the programming language used to specify operations of ED 101 in this embodiment to allow one skilled in the art to read DEFAULT_TABLE. Other embodiments may of course use other programming languages. Each operation specified by the programming language is enclosed in square brackets. An operation is defined by specifying the operation and then its operands. The operands may be literal values, variables in Control Data 115, and values produced by other operations. For example, [Echo char] on line 46 specifies that the Echo operation, corresponding to the echo procedure in Buffer and Display Coordinator 729, is to be performed using the current value of the variable char in Interpreter Control State 705.

A more complicated example is the following, on line 51: [Do [Echo " "] While [Mod cursor_pos 8]]. As indicated by the range of values, this operation provides a visual representation on Display 107 corresponding to an ASCII Tab character (ASCII code 9). Do While specifies that the operation following the Do is to continue as long as the value returned by the operation following the While is not equal to 0. Here, the operation following the Do, [Echo " "] causes a blank to appear on Display 107 and also increments the variable cursor_pos in Buffer and Display Control State 730 by 1. [Mod cursor_pos 8] finds the modulo of the value currently contained in cursor_pos and 8. The modulo equals 0 only if cursor_pos is evenly divisible by 8. Consequently, the entire operation specifies that blanks are to be output on Display 107, that each time a blank is output, the modulo of cursor_pos and 8 is to be calculated, and that output of blanks is to stop when the modulo of cursor_pos and 8 reaches 0, i.e., when the position of the next tab stop in Display 107 has been reached. As will be seen when EDITREAD_SYS_CALL is examined in more detail, the names used to specify variables and operations in the programming language correspond to names defined in EDITREAD_SYS_CALL.

6.1.2. Hexadecimal Representation of Default Table 801—FIG. 8

FIG. 8 is a hexadecimal representation of Default Table 801. Default Table 801 is represented as an array of values represented by four hexadecimal digits. Each digit represents four bits, and consequently, each group represents 16 bits or two bytes. In order to facilitate references to parts of Default Table 801, row and column indexes have been added to FIG. 8. In the ensuing discussion, a given group of hexadecimal digits is referred to by its row and column number. In addition, FIG. 8 is marked to show the correspondence between the parts of Editing Table 111 as represented in FIG. 2 and the bytes of Default Table 801. The correspondence is further established by the table below the representation of Default Table 801. As specified by DEFAULT_TABLE, Default Table 801 has Locator Information 201, Dispatch Table 203, Initial Sequence 205, Display Sequences 209, and 7 Buffer Editing Sequences 211, for values of State 121 from 0 through 6. Default Table 801 has no Final Sequence 207.

The part of Default Table 801 labelled ES 805, occupying words 2,7 and 2,8, may serve as an example of a specific Editing Instruction Sequence 215. As may be seen by the fact that ES 805 is the first Editing Instruction Sequence in Display Sequences 109, it corresponds to line 50 of DEFAULT_TABLE. The first two bytes of ES 805 are LV 219 and UV 221; as specified on line 50 of DEFAULT_TABLE, LV contains the hexadecimal value 20 and UV the hexadecimal value 7F. The next byte is Size 223; it contains the hexadecimal value 1, so the remainder of ES 805 contains a single byte. That byte contains the hexadecimal value 76; as will be seen in detail later, that value is an operation code which causes the INTERPET procedure to invoke the echo procedure with the data code or input code used in the invocation of INTERPRET. Other parts of Default Table 801 important to the discussion have also been labelled; these parts will be explained in detail in the pertinent parts of the discussion.

6.2. Operation of a Present Embodiment of ED 101 with Default Table 801

As previously explained and as illustrated in FIG. 7, operation of a present embodiment of ED 101 begins with the invocation of the procedure EDITREAD_SYS_CALL by a program using ED 101. The first portion of EDITREAD_SYS_CALL to be executed is Initial Control 707.

6.2.1. Operation of Initial Control 707

Initial Control 707 begins on page 2 of EDITREAD_SYS_CALL. As may be seen there, this portion of EDITREAD_SYS_CALL first initializes various variables, and then invokes the paint procedure in order to display visual representations of the contents of Working Buffer 113 on Display 107. The paint procedure, on page 17 of EDITREAD_SYS_CALL, contains a loop (lines 136 to 153) which for each printable data code in Working Buffer 113 first invokes the true_buff procedure to fetch the data code from Working Buffer 113 (line 137) and then invokes the INTERPET procedure (line 148) with the data code and a value specifying that INTERPRET is to obtain the Editing Instruction Sequence 215 corresponding to the data code from Display Sequences 209. The value is represented in the invocation by the name ECHO_STATE.

Turning now to INTERPRET, on pages 4 and 5 of EDITREAD_SYS_CALL, there may be seen on lines 466 to 470 a group of statements which are executed when INTERPRET is invoked with the value represented by ECHO_STATE. These statements set the variable mstrt from the variable echo_macro_start and mstop from the variable echo_macro_size. As previously explained, these variables, declared in CHANNEL_DATA, refer to values in Locator Information 201 of Default Table 801 which locate the beginning and end of Display Sequences 209. Thus, the variable mstrt now specifies the location of the first byte first byte in Display Sequences 209 and the variable limit specifies the last byte in Display Sequences 209.

Next, the loop on lines 484 to 492 searches Display Sequences 209 for an Editing Instruction Sequence 215 whose LV 219 and UV 221 specify a range of values which includes the data code or input code used to invoke INTERPRET. If it finds such a sequence, statements in the loop set the variable mstrt to specify the first byte of Editing Instruction Bytes 225 and the variable mstop to specify the last byte. The value to which the latter variable is set is calculated from Size 223. After these variables have been set, control is transferred to START_INTERPRETING (line 495). Otherwise, the loop continues searching until it finds an Editing Instruction Sequence 215 corresponding to the code or reaches the end of Display Sequences 209.

Generally speaking, the data codes in Working Buffer 113 are data codes for printable characters. In this case, as previously explained, the relevant Editing Instruction Sequence is ES 805, whose Editing Instruction Bytes 225 consist of a single byte having the hexadecimal value 76 (decimal 118). Continuing the explanation on the assumption that the data code used to invoke INTERPRET is one for a printable character, when control is transferred to START_INTERPRETING, mstrt specifies the location of the last byte in ES 805 and mstop specifies the same location. Consequently, the DO WHILE loop on lines 509 through 863 executes only once. The first statement in the DO WHILE loop assigns the value of the byte specified by mstrt to the variable byte. In the present case, the variable byte thus receives the decimal value 118. The value of byte is then used as an index into OPERATOR_DISPATCH_TABLE. As may be seen on line 49 of page 3 of the declarations in Appendix A, the 118th element of OPERATOR_DISPATCH_TABLE contains the value 5.

That value is then used to determine which of the cases in the DO CASE statement on lines 516 through 845 is to be executed. The case for the value 5 is found on lines 541 through 544; the statements at this location invoke the procedure echo using the data code received when INTERPET was invoked. As previously explained, the echo procedure causes the put_chr procedure to output the data code to Display Buffer 309.

The paint procedure performs the steps described above for every data code contained in Working Buffer 113; consequently, when the paint procedure is finished, Display Buffer 309 contains display codes corresponding to the data codes in Working Buffer 113, and when the flush_buffer procedure is invoked, Display 107 displays a visual representation of Working Buffer 113.

Returning to page 4 of EDITREAD_SYS_CALL, the portion of EDITREAD_SYS_CALL corresponding to Initial Control 707 next invokes INTERPRET in order to execute Editing Instruction Bytes 215 contained in Initial Sequence 205 (line 413). In Default Table 801, these are the bytes labelled IM 806. They correspond to the operation specified by [Set_cursor_type insert_mode] on line 46 of DEFAULT_TABLE. The operation sets the variable cursor_type to the value of the variable insert_mode and thereby determines how Display 107 will show the location of the cursor. In this operation, set_cursor_type is the operator and insert_mode the operand; as previously explained, in Editing Instruction Bytes 225, the bytes specifying the operands precede the byte specifying the operation; consequently, the hexadecimal value 42 in IM 806 specifies the operand and the hexadecimal value 9B the operator.

As may be seen from the statements for this case on lines 471 through 476, mstrt is set to 1 and mstop set to the value obtained from Initial Macro Size 803, in this case, 2, specifying 2 bytes. The statements beginning with START_INTERPETING then work as previously described, except that there are two bytes to be interpreted, and consequently, the DO LOOP is executed twice.

On the first execution, the variable byte has the hexadecimal value 42 (decimal 66); the 66th entry of OPERATOR_DISPATCH_TABLE, page 3, line 47, has the value 4, and the fourth case of the DO CASE statement (lines 536–539 of EDITREAD_SYS_CALL) places the value of the variable specified by the value of byte, in this case, the variable insert_mode, onto Interpreter Stack 725.

On the second execution, byte has the hexadecimal value 9B (decimal 155); the 155th entry of OPERATOR_DISPATCH_TABLE, page 3, line 51 of the declarations, has the value 31, and the 31st case of the DO CASE statement (lines 684 to 693 on page 9 of EDITREAD_SYS_CALL) specifies that the value at the top of Interpreter Stack 725 be assigned to the variable CURSOR_TYPE. Since that value is the value of the variable insert_mode, CURSOR_TYPE receives that value as specified on line 46 of DEFAULT_TABLE.

6.2.2. Operation of Control Loop 705

Having finished Initial Control 707, EDITREAD_SYS_CALL enters Control Loop 705, lines 422 to 427 on page 4, and continues reading input codes from Input 109 until it receives a delimiter code. As previously mentioned, Read Function 711 invokes the procedure flush_buffer of Screen Control 713, and therefore, the contents of Display Buffer 309 are displayed on Display 107 each time a character is read. For the purposes of this example, it will be assumed that EDITREAD_SYS_CALL receives three input codes; a byte containing the binary representation of 6, specifying a search to the right of the cursor for the data code specified by the next input code, a byte containing the binary representation of 65, specifying the character "A" to be searched for, and a byte containing the binary representation of 10, specifying an ASCII new-line character, which Default Table 801 defines as a delimiter.

Turning first to DEFAULT_TABLE in Appendix B to see what actions Default Table 801 defines for these input codes, the action for the search forward is defined on line 99:

```
06.06: [Set state 2]
```

This portion of DEFAULT_TABLE specifies that the variable state corresponding to State 121 is to be set to the value of 2. When the next input code, 65, comes in, State 121 has the value 2, INTERPRET is invoked with that value, and the procedure uses the instruction sequence specified at lines 122 and 123 of DEFAULT_TABLE:

```
00.FF: [Mod_attribute V2 [Minus[Search char]]]
       [Set state 0]
```

The above instructions specify that ED 101 is to search for the character, if it finds it, modify the manner in which the range of characters between the beginning and the end of the search is displayed to show the range of the search, and then reset State 121 to 0. The instructions for the delimiter character are found on line 109 of DEFAULT_TABLE:

```
0A.0F: [Delimit]
```

The operation specified by this instruction will be explained in detail below.

The Editing Instruction Sequences 215 in Default Table 801 corresponding to these instructions in DEFAULT_TABLE are labeled in FIG. 8. ES 807 corresponds to 06,06: [Set state 2]; ES 809 corresponds to

```
00.FF: [Mod_attribute V2 [Minus[Search/B char]]]
       [Set state 0]
```

and ES 811 corresponds to 0A,0F: [Delimit].

ED 101 executes the above Editing Instruction Sequences in response to the input codes 6, 65, and 10 as follows: As shown on line 426 of EDITREAD_SYS_CALL, each time Control Loop 705 has obtained a new input code by invoking the read procedure, it invokes INTERPRET using the input code and the current value of State 121. Lines 462 to 465 in INTERPRET show how INTERPRET uses the input code and the value of State 121 to produce the location of the proper Editing Instruction Sequence 215 in Default Table 801. As previously mentioned, the variable DISPATCH_TABLE identifies Dispatch Table 203, consisting in Default Table 801 of words 1,6 to 2,5. The first word in Default Table 801 contains the offset in bytes from the start of Initial Sequence 205 of Buffer Editing Sequence 213 for State=0, the second the offset for State=1, and so forth. Using the value of State 121 as an index into DISPATCH_TABLE, INTERPRET locates the beginning and end of Buffer Editing Sequence 213 for the given state value and sets mstrt to the beginning and limit to the end. INTERPRET then locates Editing Instruction Sequence 215 for the input code and executes that Editing Instruction Sequence as previously described.

Since one skilled in the art may understand from the explanations already presented and from the source text of EDITREAD_SYS_CALL how the specified Editing Instruction Sequences 215 in Default Table 801 are interpreted by the INTERPRET procedure, further detail is presented only with regard to the manner in which execution of [Delimit] causes ED 101 to cease operation.

6.2.3. Termination of Operation of an Embodiment of ED 101

The statements executed in the INTERPRET procedure when a delimiter character is received are on lines 553 to 562. The bulk of these statements deals with the fact that delimiters used in the present embodiment of ED 101 may consist of either one- or two-byte codes and are not important to this discussion. The statements which actually cause ED 101 to terminate operations are on lines 560 and 561. The assignment statement on line 560 sets State 121 to a value which is greater than the number of states for which there are Editing Instruction Sequences 215 in Default Table 801, and the assignment statement on line 561 sets macro_index to 1000, which is greater than any possible value of mstop. When macro_index has a value greater than mstop, the DO WHILE loop which begins on line 509 terminates. That in turn results in execution of the RETURN statement on line 866, which causes control to return to Control Loop 705, on lines 422 to 427. Since State 121 now has a value greater than the number of states in Default Table 801, the loop terminates and Final Control 703 begins executing.

6.2.3.1. Operation of Final Control 703

As may be seen from line 433, Final Control 703 once again invokes INTERPRET, this time with FINAL_STATE. The statements in INTERPRET for that state are on lines 477 to 482. These statements locate Final Sequence 211 from the value of the variable final_macro_start and the value of Final Macro Size 813. Since Default Table 801 has no Final Sequence 211, final_macro_start specifies the beginning of Display Sequences 209 and, as may be seen from FIG. 8, Final Macro Size 813 has the value 0. Thus, when control is transferred to START_INTERPRETING, mstop is less than mstart and the DO WHILE loop beginning on line 509 is not executed. INTERPRET thus returns to Final Control 703 (lines 429 to 445) without performing any actions, and Final Control 703 concludes the operation of ED 101 by calling flush_buffer to output the contents of Display Buffer 309 to Display 107 and then returning to the program which invoked EDITREAD_SYS_CALL. The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

APPENDIX A

Appendix A presents the PL/I source text for the instructions used to implement the present embodiment of Editread Interpreter 101 and the PL/I data declarations required to understand the PL/I source text. Pages of the source text bear the label EDITREAD_SYS_CALL in their upper left-hand corners; the pages of the data declarations follow the source text and bear the labels ERROR_CODES, EXTENDED_READ, PACKET, REPLACES, and TERMINAL_DATA.

```
+------------------------------------------------------------------------+
|                          /*---------------------+                       |
|                          | Editread interpreter |                       |
|                          +---------------------*/                       |
|                                                                        |
| EDITREAD_SYS_CALL:                                                     |
|    PROCEDURE            (packet_address);                              |
|                                                                        |
| DCL packet_address                         pointer;    /* Read only  */ |
|                                                                        |
| /*-------------------------------------------------------------------+ |
| | -- ACTION:   This program implements a test version of Editread.    | |
| |                  It uses an editing table established externally.   | |
| |              Typically a built-in, shared, table would be used.     | |
| |              Here the table is supplied externally.                 | |
| |              The arguments are supplied via PACKET.                 | |
| |              Some of the arguments are addresses which in the real  | |
| |              implementation would be obtained via ?MBFU.            | |
| |                                                                     | |
| | -- CONTACT:  Roger Banks, RTP                                       | |
| | -- VERSION:  01.00                        DATE:  Jan 00, 1981       | |
| |                                                                     | |
| | -- NOTES:    To bound PMGR time, an upper bound on OPs executed can | |
| |              be maintained.  E.g. after 200 ops, return anyway.     | |
| |              "Implementation Notes for the TANG Read Abstractions"  | |
| |              by Roger Banks, doc # TANG-25, describes this implem'n | |
| |              in greater detail.                                     | |
| +-------------------------------------------------------------------*/ |
|                                                                        |
| %INCLUDE "replaces.in";                                                |
| %INCLUDE "packet.in";                                                  |
| %INCLUDE "error_codes.in";                                             |
| %INCLUDE "terminal_data.in";                                           |
| %INCLUDE "extended_read.in";                                           |
|                                                                        |
| /* The following 2 routines simulate dealing with the input and output |
|    ring buffers. */                                                    |
| DCL BINARY_READ_STRING ENTRY (fixed,           /* channel        */    |
|                               fixed,           /* How many bytes */    |
|                               char(*)var,      /* record         */    |
|                               bit);            /* End of file?   */    |
| DCL BINARY_WRITE_STRING ENTRY (fixed,          /* channel        */    |
|                                char(*)var);    /* record         */    |
|                                                                        |
| %REPLACE TOGGLE                  BY -1;                                |
| %REPLACE WRITE_CURSOR_VALUE      BY 16;                                |
| %REPLACE CURSOR_LEFT_VALUE       BY 25;                                |
| %REPLACE CURSOR_RIGHT_VALUE      BY 24;                                |
| %REPLACE FINAL_STATE             BY 255;                               |
| %REPLACE INITIAL_STATE           BY 254;                               |
| %REPLACE ECHO_STATE              BY 253;                               |
| %REPLACE INSERTING               BY 1;                                 |
| %REPLACE OVERSTRIKE              BY 0;                                 |
| %REPLACE MATCH                   BY "1"b;                              |
| %REPLACE NOMATCH                 BY "0"b;                              |
| %REPLACE LEFT                    BY -1;                                |
| %REPLACE RIGHT                   BY  1;                                |
| %REPLACE NORMAL                  BY  1;                                |
| %REPLACE YES                     BY  1;                                |
| %REPLACE NO                      BY  0;                                |
| %REPLACE RING_BUFFER_SIZE        BY  20;                               |
| %REPLACE STACK_SIZE              BY  20;                               |
|                                                                        |
| /* The sizes for the based variables below are artificial.            |
|    Most of the time, much less space will have been allocated. */      |
|                                                                        |
| DCL buffer             char (256) var              BASED (buffer_ptr), |
|     tab_string         aligned bit (4080) BASED (USER_ARRAY_ADDRESS),  |
|     user_array         (255) fixed       BASED (USER_ARRAY_ADDRESS),   |
|     insertion_buffer   char (256)var BASED (INSERTION_BUFFER_ADDRESS), |
|                                                                        |
```

```
/* The next variable is just a local copy of BUFFER_ADDRESS from
   the user packet.  It is used to save 1 level of indirection in
   referencing buffer.  */

    buffer_ptr                                      pointer,

/* The following variables are all temporary and need NOT persist
   between keystrokes. (This includes the stack!) */

    stack                            (STACK_SIZE) fixed,
    stack_ptr                                     pointer,
    stack_ptr_fixed                         fixed DEFINED (stack_ptr),
    1 stack_data                                  BASED   (stack_ptr),
      2 stack_prev                                fixed,
      2 stack_top                                 fixed,
      2 stack_next                                fixed,
    1 stack_taken_as_chars                        BASED   (stack_ptr),
      2 unused1                                   fixed,
      2 unused2                                   fixed,
      2 stack_next_hi_byte                        char,
      2 stack_next_lo_byte                        char,
    (shadow_echo_mode, shadow_code)               fixed,

/* Next    variable is  assigned once and never changes.  PL1 doesn't
   let me initialize it   as though it   were constant. */

     stack_overflow                                fixed;

DCL (XOR, AND)  ENTRY (fixed,fixed) RETURNS (fixed);

DCL OUTPUT_RING_BUFFER     char (RING_BUFFER_SIZE) var static external
                           initial ("");

                          /*-----------------+
                          |      CODE        |
                          +-----------------*/

/*----------------------------------------------------------------+
| Allocate space for user packet plus space for variables which must |
| be preserved between keystrokes.  A real implementation would MBFU |
| to get the data as shown.  Here we already have the pointer.       |
+----------------------------------------------------------------*/

/* ALLOCATE PACKET SET (packet_ptr);          */
/*                                            */
/* MBFU:                                      */
/* packet_ptr      -> PACKET.user_packet =    */
/* packet_address -> PACKET.user_packet;      */

/*----------------------------------------------------------------+
| Extract address of buffer from packet.  (We could use             |
| this pointer directly out of packet.  However due to frequency of |
| use, I put it into a local variable.)                             |
+----------------------------------------------------------------*/

   buffer_ptr  = BUFFER_ADDRESS;

   IF buffer_index <= 0 | buffer_index > buffer_length + 1 THEN
      CALL ERR (TPOS_OUT_OF_BOUNDS);

/*----------------------------------------------------------------+
| Actually I should also have ALLOCATEd a buffer and MBFU'd it from  |
| user space the same as packet.  Similarly for the insertion buffer |
| and also the user_array.  The trial will MBFU these as needed.     |
| Now initialize some interpreter variables.                         |
| Initialization of state, delimiter & delimiter_length are optional.|
| If not initialized, could allow easier reposting an interrupted read|
+----------------------------------------------------------------*/

   stack_ptr        = ADDR (stack (1));      /* stack starts at 1   */
   /* stack_overflow will never change again */
```

```
   stack_overflow    = stack_ptr_fixed + STACK_SIZE - 3;
   status_code       = 0;
   state             = 0;
   delimiter         = 0;
   delimiter_length  = 0;
   visible_eol       = field_size;

/*----------------------------------------------------------------------+
 | Echo initial buffer contents if requested.  Set cursor and          |
 | attribute state either way.                                         |
 +----------------------------------------------------------------------*/

   attribute_state  = 0;
   cursor_pos       = 0;
   shadow_echo_mode = NO;
   IF already_displayed = YES THEN
      CALL set_cursor_and_attribute (buffer_index);
   ELSE
      do;
      CALL paint (1, buffer_index - 1);
      CALL paint_and_restore_state (buffer_index, buffer_length);
      end;

/*----------------------------------------------------------------------+
 | Invoke init macro.                                                  |
 +----------------------------------------------------------------------*/

   CALL INTERPRET (0, INITIAL_STATE);

/*----------------------------------------------------------------------+
 | Read bytes from keyboard and lookup macro as function of state and  |
 | read byte.  Perform macro.                                          |
 | Optimization possible:  cursor degradation checks need not be done  |
 | until input buffer is empty.  Must degrade cursor while waiting.    |
 +----------------------------------------------------------------------*/

   DO WHILE (state < number_states);
      CALL chk_cursor_degradation;    /* SET  In case cursor_type set */
      char = read();                  /* Degradation in effect here   */
      CALL chk_cursor_degradation;    /* CLEAR (second toggle clears) */
      CALL INTERPRET (char, state);
   END;

/*----------------------------------------------------------------------+
 | Invoke final macro.                                                 |
 +----------------------------------------------------------------------*/

   CALL INTERPRET (0, FINAL_STATE);

ALL_DONE:                  /* Comes here via non-local goto from ERR. */

   CALL flush_buffer;                 /* Empty the ring buffer */

/* Here should MRIU the packet back to the user_packet exactly the
   same as the MRFU at entry.  This PL1 version need not do this.  */

   CURRENT_ROW = field_vert +      /* Could be done at caller */
                 DIVIDE (field_horiz + cursor_pos, CPL, 15);

   RETURN;

/* --------------------- Internal Routines ----------------------- */

INTERPRET:
   PROCEDURE (lookup_char, lookup_state);
   DCL (lookup_char, lookup_state,                          /* Read only */
        mstrt, mstop, limit, lower, upper)        fixed,
       (save_stack_ptr, save_attr)                fixed,
       (macro_index, old_rendition, byte)         fixed;
```

```
/*-----------------------------------------------------------------------+
| Use lookup_char and lookup_state to find where in MACRO_TABLE the    |
| macro starts.  Set mstrt and mstop to these values.                  |
+-----------------------------------------------------------------------*/

   IF lookup_state < number_states THEN
      do;
      mstrt = DISPATCH_TABLE (lookup_state    );
      limit = DISPATCH_TABLE (lookup_state + 1) - 1;
      end;
   ELSE IF lookup_state = ECHO_STATE THEN
      do;
      mstrt = echo_macro_start;
      limit = mstrt + echo_macro_size - 1;
      end;
   ELSE IF lookup_state = INITIAL_STATE THEN
      do;
      mstrt = 1;
      mstop = initial_macro_size;
      GOTO START_INTERPRETING;
      end;
   ELSE                       /*  FINAL_STATE  */
      do;
      mstrt = initial_macro_size + 1;
      mstop = mstrt + final_macro_size - 1;
      GOTO START_INTERPRETING;
      end;

   DO WHILE (mstrt < limit);  /* Scan chain for STATE, ECHO macros */
      lower = RANK (SUBSTR (MACRO_TABLE, mstrt,     1));
      upper = RANK (SUBSTR (MACRO_TABLE, mstrt + 1, 1));
      mstrt = mstrt + 3;
      mstop = mstrt + RANK (SUBSTR (MACRO_TABLE, mstrt - 1, 1)) - 1;
      IF lookup_char >= lower THEN
         IF lookup_char <= upper THEN GOTO START_INTERPRETING;
      mstrt = mstop + 1;
   END;
      RETURN;   /* Didn't find macro--behave as no-op */

START_INTERPRETING:

/*-----------------------------------------------------------------------+
| Now iterate macro string delimited by mstrt and mstop.  Each byte is|
| either a number constant (in range 0 to 64), a read_write varible,  |
| a read_only variable, an operation, a user variable or bignum (>64).|
| All operation ops push                                               |
| their result onto the argument stack (and pop their needed args)     |
| except for POP_UP and the GOTOs under specified circumstances.       |
+-----------------------------------------------------------------------*/

   save_stack_ptr  = stack_ptr_fixed;

   macro_index = mstrt;
   DO WHILE (macro_index <= mstop);
      CALL next_macro_byte;

      /* OPERATOR_DISPATCH_TABLE converts edit operation (i.e., byte in
         range of 0:255) into a dispatch to one of the following
         pieces of code.*/

      DO CASE (OPERATOR_DISPATCH_TABLE (byte));

/*  1 */ do; stack_next = byte; GOTO PUSH_STACK; end; /*Small number */

/*  2 */ do;                                          /* Big number */
         CALL next_macro_byte;
         stack_next_hi_byte = ASCII (byte);
         CALL next_macro_byte;
         stack_next_lo_byte = ASCII (byte);
         GOTO PUSH_STACK;
         end;
```

```
/*  3 */ do;                                          /* User    Variable */
         CALL next_macro_byte;
         IF byte <= 0 ! byte > USER_ARRAY_SIZE THEN
            CALL ERR (ILLEGAL_USER_VARIABLE);
         stack_next = user_array (byte);
         GOTO PUSH_STACK;
         end;

/*  4 */ do;                        /* Regular Variable (except 'char') */
         stack_next = packet_array (byte + 1 - V0_VAR);
         GOTO PUSH_STACK;
         end;

/*  5   ECHO_CHAR_OP (Equiv to [Echo char]) */
         do;
         CALL echo (lookup_char);
         GOTO PUSH_STACK;
         end;

 /*  6   INSERT_CHAR_OP */
         do;
         CALL INSERT (lookup_char);
         GOTO PUSH_STACK;
         end;

 /*  7   DELIMIT_OP:  redundant compound operation for:    */
         do;
         delimiter_length = delimiter_length + 1;
         IF delimiter_length = 1
            THEN delimiter = lookup_char * 256;
            ELSE delimiter = delimiter + lookup_char;
         status_code = DELIMITER_TYPED;
         state = TERMINATE;
         macro_index = 10000;  /* Force return */
         end;

 /*  8   BELL_OP */
         do;  CALL echo_binary (7); GOTO PUSH_STACK;  end;

/******* Begin 1-argument ops ******************************************/

/*  9    ECHO_BINARY_OP */
         CALL echo_binary (stack_top);

/* 10    All regular variable assignments come here except
         buffer_index and insert_mode. */
         do;                                        /* Assign variable */
         byte = byte - SET_OFFSET;
         packet_array (byte + 1 - V0_VAR) = stack_top;
         end;

/* 11    INSERT_OP     */
         CALL INSERT (stack_top);

/* 12    MOVE_OP       (see also SET_BUFFER_INDEX_OP) */
         stack_top = MOVE  ( stack_top);

/* 13    MINUS_OP (unary) */
         stack_top = -stack_top;

/* 14    DELETE_OP     */
         stack_top = DELETE( stack_top);

/* 15    Literal (-1) provided to elim need for [Delete/B 1], etc  */
         do; stack_next = -1; GOTO PUSH_STACK; end;

/* All this search code could be simplified by having the compiler
   generate either 1) a do-until loop (eliminating search altogether)
   or 2) adding args, making the internal Search take its args
   from the interpreter stack and combining the next 4 lines.
```

```
Or...
    Interpret could be modified to have a secret entry to allow
    interpreting internal code.  Then Search (and other) subroutine(s)
    would probably take less space if coded in interpreter code rather
    than in MASM.  Additional primitives might be needed to win big. */

/* 16     SEARCH_OP      */
          CALL           SEARCH (stack_top, RIGHT, MATCH);

/* 17     SEARCHB_OP     */
          CALL           SEARCH (stack_top, LEFT,  MATCH);

/* 18     SEARCHN_OP     */
          CALL           SEARCH (stack_top, RIGHT, NOMATCH);

/* 19     SEARCHBN_OP    */
          CALL           SEARCH (stack_top, LEFT,  NOMATCH);

/* 20     BUFFER_OP      */
          IF stack_top < 1 | stack_top > buffer_length
             THEN stack_top = -1;
             ELSE stack_top = buffer_op (stack_top);

/* 21     ECHO_OP        */  CALL echo (stack_top);

/* 22     TAB_OP         */
          /* Check range here?  In general, we have assumed edit tables
             to be bug free but if we ever export the abstraction to
             general users, such checking would become necessary. */
          IF SUBSTR (tab_string, stack_top, 1) THEN stack_top = 1;
                                                ELSE stack_top = 0;

/* 23     NOT_OP         */
          IF stack_top = 0 THEN stack_top = 1; ELSE stack_top = 0;

/* 24     UGOTO_OP                          2-byte unconditional jump */
          do;
          stack_next = 0;                  /* False means always jump */
          GOTO GOTOOP_LABEL;
          end;

/* 25     GOTO_OP                             2-byte conditional jump */
             /* Gotos pop the stack when jumping backwards, not when
             jumping forward.  Conditional GOTOs that fall through
             will do the opposite--if a forward jump, it will pop, etc*/
          do;
          stack_next = stack_top;     /* Used as temporary storage */
GOTOOP_LABEL:
          CALL next_macro_byte;
          byte = byte - 128;
          IF stack_next ^= 0 THEN                     /* Fall through */
             IF byte > 0 THEN GOTO POP_STACK;
                          ELSE;
          ELSE
             do;
             macro_index = macro_index + byte;
             IF byte < 0 THEN                    /* backward jump    */
                do;
                macro_index = macro_index - 2;           /* Jump back */
                GOTO POP_STACK;                          /* & pop     */
                end;
             end;
          end;
/* 26     POP_OP    */      GOTO POP_STACK;

/* 27     INS_BUF_OP     */
          IF stack_top > INSERTION_BUFFER_SIZE THEN /* See note at TAB*/
             stack_top = -1;
          ELSE
             stack_top = RANK (SUBSTR (insertion_buffer, stack_top, 1));
```

```
/* 28     SET_OP.   User variable assignments come here (except V0) */
          do;
          CALL next_macro_byte;          /* All info is in 2nd byte */
          IF byte <= 0 ! byte > USER_ARRAY_SIZE THEN
                                  CALL ERR (ILLEGAL_USER_VARIABLE);
          user_array (byte) = stack_top;
          end;

 /* 29    ECHO_SET_ATTRIBUTE_OP */
          CALL set_attribute (stack_top);

 /* 30    ECHO_MOD_ATTRIBUTE_OP */
          CALL mod_attribute (stack_top);

                                                  /* 2 argument ops */
/* 31     SET_CURSOR_TYPE_OP */
          do;
          CURSOR_TYPE = stack_top;
          IF TERMINAL_TYPE = LEMITE THEN
             do;
             /* Output cursor_type sequence */
             CALL echo_binary (30); CALL echo_binary (70);
             CALL echo_binary (81); CALL echo_binary (49 + CURSOR_TYPE);
             end;
          end;

/* 32     SET_BUFFER_INDEX_OP:   Assignment to Buffer_index
             Purely as a convenience, we allow buffer_index to
             act like a writable variable by intercepting it
             and doing a MOVE instead.  */
          stack_top = MOVE (stack_top - buffer_index);

/* 33     DATA_OP */
          stack_top = RANK (SUBSTR (MACRO_TABLE,
                         DISPATCH_TABLE (number_states) + stack_top, 1));

/* 34     ADD_OP */
          do; stack_prev = stack_prev + stack_top; GOTO POP_STACK; end;

/* 35     SUB_OP */
          do; stack_prev = stack_prev - stack_top; GOTO POP_STACK; end;

/* 36     MUL_OP */
          do; stack_prev = stack_prev * stack_top; GOTO POP_STACK; end;

/* 37     DIV_OP */
          do;
          stack_prev = DIVIDE (stack_prev, stack_top, 15);
          GOTO POP_STACK;
          end;

/* 38     MOD_OP */
          do;
          stack_prev = MOD    (stack_prev, stack_top);
          GOTO POP_STACK;
          end;

/* 39     EQ_OP  */
          do;
          IF stack_prev = stack_top THEN stack_prev = 1;
                                    ELSE stack_prev = 0;
          GOTO POP_STACK;
          end;
/* 40     NE_OP  */
          do;
          IF stack_prev ^=stack_top THEN stack_prev = 1;
                                    ELSE stack_prev = 0;
          GOTO POP_STACK;
          end;
/* About half of the following are redundant--the compiler could
   change a GT, for example, into an LT by swapping the arguments
```

```
    when there are no internal side effects or into an LE by
    appending a NOT when there are.  E.g. [GT VS 128] => [LT 128 VS]
    or [GT V1 [Set V1 V0]] => [NOT [LE V1 [Set V1 V0]]].            */
/* 41    GT_OP  */
         do;
         IF stack_prev > stack_top THEN stack_prev = 1;
                                   ELSE stack_prev = 0;
         GOTO POP_STACK;
         end;
/* 42    GE_OP  */
         do;
         IF stack_prev>= stack_top THEN stack_prev =1;
                                   ELSE stack_prev =0;
         GOTO POP_STACK;
         end;
/* 43    LT_OP  */
         do;
         IF stack_prev < stack_top THEN stack_prev =1;
                                   ELSE stack_prev =0;
         GOTO POP_STACK;
         end;
/* 44    LE_OP  */
         do;
         IF stack_prev <=stack_top THEN stack_prev =1;
                                   ELSE stack_prev =0;
         GOTO POP_STACK;
         end;
/* 45    AND_OP */
         do;
         stack_prev = stack_top * stack_prev;
         GOTO POP_STACK;
         end;
/* 46    OR_OP  */
         do;
         IF stack_prev ^= 0 | stack_top ^= 0 THEN stack_prev = 1;
                                             ELSE stack_prev = 0;
         GOTO POP_STACK;
         end;

/* 47    XEQ_OP */
         do;      /* For now, one level only of recursion */
         /* WHY DO WE LIMIT RECURSION LEVEL?  WHY NOT LET IT
            GENERATE A STACK_OVERFLOW ERROR?  THIS CAN ALREADY HAPPEN
            WITH AN OVERLY DEEP EXPRESSION. */
/*       IF xeq_in_progress = YES THEN CALL ERR (ILLEGAL_USE_OF_XEQ);
         xeq_in_progress = YES;   */
         CALL INTERPRET (stack_top, stack_prev);  /* Recurse */
/*       xeq_in_progress = NO;    */
         IF state = TERMINATE THEN macro_index = 10000; /* Unwind */
         GOTO POP_STACK;
         end;

/* 48    SET_ATTRIBUTE  (This is the only 3-arg op so far.) */
            do;
            stack_ptr_fixed = stack_ptr_fixed - 1;  /* Extra pop */
            CALL mod_set_attribute_op (stack_prev, stack_top,
                                       stack_next);
            GOTO POP_STACK;
            end;

/* 49    MOD_ATTRIBUTE      */
            do;
            CALL mod_set_attribute_op (stack_prev, TOGGLE, stack_top);
            GOTO POP_STACK;
            end;

/* 50 */ do;                /* reference to char (treated specially) */
         stack_next = lookup_char;
         GOTO PUSH_STACK;
         end;
```

```
/* 51    Assign insert_mode */
         do;
         /* This code assures opportunity to change rendition whenever
            insert_mode changes.  (E.g.  Screenedit's "hole").  It
            could probably be replaced with a call to INSERT of
            whatever character is already there, letting INSERT do
            all the shadowing, etc.  Overstriking would be required. */

         CALL shadow_echo (buffer_index, buffer_length,byte,save_attr);
         insert_mode = stack_top;
         old_rendition = shadow_code;
         CALL shadow_echo (buffer_index, buffer_length,byte,save_attr);
         IF old_rendition ^= shadow_code THEN
            CALL paint_and_restore_state (buffer_index, buffer_length);
         end;

/* 52    1-byte conditional GOTOs all come here    */
         do;
         byte = byte - GOTO_OP_DIVISION;
         IF byte > 0        /* Forward branch */
            THEN IF stack_top = 0
                 THEN macro_index = macro_index + byte;    /* Jump */
                 ELSE GOTO POP_STACK;                      /* Pop  */
            ELSE IF stack_top = 0 THEN
                    do;
                    macro_index = macro_index + byte - 1; /* Both */
                    GOTO POP_STACK;
                    end;
         end;


/* 53    All else is illegal */
         CALL ERR (ILLEGAL_OPERATION);

      END; /* Giant DO CASE */
      OTHERWISE ; /* Should never get here */

      GOTO BIG_LOOP_END;

PUSH_STACK:
      IF stack_ptr_fixed >= stack_overflow THEN
         CALL ERR (STACK_OVERFLOW);
      stack_ptr_fixed = stack_ptr_fixed + 1;
      GOTO BIG_LOOP_END;

POP_STACK:
      stack_ptr_fixed = stack_ptr_fixed - 1;
      /* Don't allow more popping than pushing */
      IF stack_ptr_fixed < save_stack_ptr THEN
         CALL ERR (STACK_UNDERFLOW);

BIG_LOOP_END:
   END; /* Big DO loop */

   stack_ptr_fixed = save_stack_ptr;      /* ensure no net change */
   RETURN;

   /* ----- next_macro_byte is a routine internal to INTERPRET ----- */
   next_macro_byte:
      PROCEDURE;
      byte = RANK (SUBSTR (MACRO_TABLE, macro_index, 1));
      macro_index = macro_index + 1;
      RETURN;
      END; /* Proc next_macro_byte */
   /* -------------------------------------------------------------- */

END; /* Procedure INTERPRET */

/* ----------------------------------------------------------------- */
buffer_op:      /* Extract character from buffer */
   PROCEDURE (logical_index) RETURNS (fixed);
```

```
    DCL (logical_index)    fixed;

    RETURN (true_buff (   true_index (logical_index)   ));

    END; /* buffer_op */

MOVE:                                  /* forward or backward */

    PROCEDURE (amt) RETURNS (fixed);
    DCL (new_cp, old_cp, old_rend, save_attribute, junk,
         amt, strt, stop, save_cursor, amt_moved)            fixed;

/* Returns distance actually moved.  Nearly all the code here is
    to allow optimizations to reduce line traffic, etc.  Only 2 lines
    of code are actually for the MOVE.   */

    strt = buffer_index;
    stop = buffer_index;

    IF amt >= 0 THEN
       do;
       amt_moved = MIN (amt, buffer_length + 1 - buffer_index);
       stop      = stop + amt_moved;
       end;
    ELSE
       do;
       amt_moved = MAX (amt, 1 - buffer_index);
       strt = strt + amt_moved;
       CALL set_cursor_and_attribute (strt);
       end;

    save_cursor   = cursor_pos;  /* For negative move */
    save_attribute= attribute_state;

    IF amt_moved = 0 THEN GOTO MOVE_EXIT;

    CALL shadow_echo (strt, stop, old_cp, junk);
    old_rend = shadow_code;             /* Save old rendition code */

    buffer_index  = buffer_index + amt_moved;  /* Do MOVE */

    CALL shadow_echo (strt, stop, new_cp, junk);

    IF old_rend = shadow_code THEN IF old_cp = new_cp THEN
       do;
       IF amt_moved > 0 THEN
          CALL shadow_echo (strt, stop-1, save_cursor, save_attribute);
       GOTO MOVE_EXIT;
       end;
                        /* gets here due to rendition or size change */
    IF amt_moved > 0 THEN
       do;
       CALL paint (strt, stop - 1);
       save_attribute = attribute_state;
       save_cursor    = cursor_pos;
       strt = stop;
       end;
    IF old_cp ^= new_cp THEN stop = buffer_length;

    CALL paint (strt, stop);

MOVE_EXIT:

    CALL set_cursor    (save_cursor);
    CALL set_attribute (save_attribute);
    RETURN (amt_moved);

END; /* Procedure MOVE */

/*-----------------------------------------------------------------*/

```

```
DELETE:

   PROCEDURE (amt) RETURNS (fixed);  /* Returns # deleted              */
   DCL (amt, del_amt, final_attr, junk)                          fixed;

   IF amt >= 0
      THEN do;
           del_amt = MIN (buffer_length + 1 - buffer_index , amt);
           /* Establish final attribute */
           CALL shadow_echo (buffer_index, buffer_index + del_amt,
                              junk,          final_attr);
           end;
      ELSE do;
           del_amt = MIN (- amt, buffer_index - 1);
           buffer_index = buffer_index - del_amt;
           final_attr   = attribute_state;
           CALL set_cursor_and_attribute  (buffer_index);
           /* Above sets cursor correctly, but not attri */
           end;

   CALL set_attribute (final_attr);

   /* Take out delete range, including boundary attributes */
   buffer = SUBSTR (buffer, 1, true_index (buffer_index - 1) ) ||
            SUBSTR (buffer, true_index (buffer_index + del_amt -1) +1);

   buffer_length = buffer_length - del_amt;

   CALL establish_attribute_in_buffer (buffer_index, final_attr);

   CALL paint_and_restore_state (buffer_index, buffer_length);

   RETURN (del_amt);

END; /* Procedure DELETE */

/*-----------------------------------------------------------------*/

INSERT:

   PROCEDURE (chr);
   DCL (old_rend, old_cp, new_cp, save_attr, dummy, ti,
        local_imode, chr, intermediate_cp)                    fixed;


   local_imode = insert_mode;
                                        /* Treat eol like insert_mode */
   IF buffer_index = buffer_length + 1 THEN local_imode = INSERTING;

   ti = true_index (buffer_index);
   IF local_imode = OVERSTRIKE
   THEN do;
        CALL shadow_echo (buffer_index, buffer_index + 1,
                          old_cp, save_attr);
        old_rend = shadow_code;
        CALL replace_true_buff (ti, chr);
        end;

   ELSE do;   /* INSERTING */
        IF LENGTH (buffer) >= max_buffer_size THEN
                                   CALL ERR (BUFFER_OVERFLOW);
        CALL insert_true_buff (ti, chr);
        buffer_length = buffer_length + 1;
        end;

   buffer_index  = buffer_index + 1;

   IF local_imode = OVERSTRIKE THEN
      CALL shadow_echo (buffer_index - 1, buffer_index,
                        new_cp, save_attr);

```

```
    CALL paint (buffer_index - 1, buffer_index - 1);
    intermediate_cp = cursor_pos;
    save_attr       = attribute_state;

    IF local_imode ^= OVERSTRIKE ! old_cp ^= new_cp THEN
            CALL paint (buffer_index, buffer_length);
    ELSE IF old_rend ^= shadow_code THEN
            CALL paint (buffer_index, buffer_index);
    CALL set_cursor (intermediate_cp);      /* May be a no-op */
    CALL set_attribute (save_attr);

    RETURN;

END; /* Procedure INSERT */

/*-----------------------------------------------------------------*/

SEARCH:

    PROCEDURE (chr, direction, match);

    DCL match                         bit,
       (chr, j, stop, direction)      fixed;
/*-----------------------------------------------------------------+
 |         Dual use of 'chr':  used as search string; also gets    |
 |         returned value (distance moved).                        |
 +-----------------------------------------------------------------*/

    IF direction = RIGHT THEN stop = buffer_length;
                         ELSE stop = 1;
    DO j = buffer_index + direction TO stop BY direction;
       IF (buffer_op (j) = chr) = match THEN
          do; chr = MOVE (j - buffer_index); RETURN; end;
    END;
    chr = 0;
    RETURN;

END; /* Procedure SEARCH */

/* -------------------------------------------------------------- */

shadow_echo:

    PROCEDURE (strt, stop, final_cp, final_attr);
    /* final_cp and final_attr are WRITE-only args */
    DCL (strt, stop, save_cp, final_cp, final_attr,
         save_veol, save_attr) fixed;

/*-----------------------------------------------------------------+
 |  Shadow echoing actually invokes the echo macros for the specified |
 |  buffer range.  However, nothing is really echoed (ECHO is disabled)|
 |  It computes two results:  rendition_size is the size in          |
 |  columns and rendition_code represents the actual characters echoed.|
 |  Shadow_echo helps to accelerate the MOVE and INSERT operations.  |
 |  Note:  If an echo macro changes V3, for example, it will NOT be   |
 |  restored following shadow echoing.                               |
 +-----------------------------------------------------------------*/

    shadow_echo_mode = YES;    /* To turn off real echoing */
    save_cp          = cursor_pos;
    save_veol        = visible_eol;
    save_attr        = attribute_state;
    shadow_code      = 0;
    CALL paint (strt, stop);

    final_cp         = cursor_pos;
    final_attr       = attribute_state;

    cursor_pos       = save_cp;       /* Leave everything unchanged */
    visible_eol      = save_veol;
    attribute_state  = save_attr;
```

```
   shadow_echo_mode = NO;
   RETURN;

END; /* Procedure shadow_echo */
/*------------------------------------------------------------------*/

paint_and_restore_state:

   PROCEDURE (strt, stop);
   DCL (strt, stop, save_attr, save_cp)              fixed;

   save_attr = attribute_state;        /* This block of code used to */
   save_cp   = cursor_pos;             /* appear in many places.     */
   CALL paint (strt, stop);
   CALL set_attribute (save_attr);
   CALL set_cursor (save_cp);
   RETURN;

END; /* paint_and_restore_state */
/*------------------------------------------------------------------*/

paint:

   PROCEDURE (strt, stop);
   DCL (strt, stop, save_cp, curchar, junk)          fixed;
   DCL real_index                                    fixed;

/*-----------------------------------------------------------------+
 |     Invokes echo macros from table for bytes in range strt/stop.  |
 |     Recognizes reserved attribute_character_marker to change      |
 |     attribute state.  Saves/Restores state before/after invoking  |
 |     echo macro to ensure no net state change.                     |
 |                                                                   |
 |     Paint will also leave the cursor and attribute state set      |
 |     correctly for the position just AFTER the range so that       |
 |     continuing to paint farther will not ignore attribute codes   |
 +-----------------------------------------------------------------*/

    real_index = true_index (strt - 1) + 1;    /*  Later accelerate! */
    echo_index = strt;

    DO WHILE (real_index <= LENGTH (buffer));  /* NOT BUFFER_LENGTH! */
       curchar = true_buff (real_index);
       IF curchar = ATTRIBUTE_STATE_MARKER THEN
          do;
          CALL set_attribute (true_buff (real_index + 1));
          real_index = real_index + 2;
          end;
       ELSE
          do;
          IF echo_index > MIN (stop, buffer_length) THEN
             GOTO PRINT_LOOP_EXIT;
          junk = attribute_state;
          CALL INTERPRET (curchar, ECHO_STATE);
          CALL set_attribute (junk);    /* Restore attr state */
          real_index = real_index + 1;
          echo_index = echo_index + 1;
          end;
    END;

 PRINT_LOOP_EXIT:

    IF stop >= buffer_length THEN          /* Cleanup EOL if necessary */
       do;
       save_cp = cursor_pos;
       DO junk = cursor_pos TO visible_eol - 1;
          CALL echo (32);     /* write a blank */
       END;
       CALL set_cursor (save_cp);
       visible_eol = cursor_pos;
       end;
```

```
   RETURN;

END; /* Procedure paint */
/*--------------------------------------------------------------------*/

set_cursor_and_attribute:

   PROCEDURE (new_loc);  /* Formerly named accelerated_set_cursor */
   DCL (new_loc,  new_cp, save_cp, new_attr, save_attr) fixed;

/*--------------------------------------------------------------------+
|     Calculates where to put cursor and then moves it.  Also         |
|     sets attribute state at this point.                             |
|     Note:  The original version avoided the need to scan from       |
|     the beginning of the line.  It was much larger so a tradeoff    |
|     of speed for space has been made.  If (MOVE/B 1) really needs   |
|     the speed, we can reinstate this code.                          |
+--------------------------------------------------------------------*/

   save_cp          = cursor_pos;
   save_attr        = attribute_state;
   cursor_pos       = 0;
   attribute_state = 0;
   CALL shadow_echo (1, new_loc - 1, new_cp, new_attr);
   cursor_pos = save_cp;  /* Must restore since set_cursor optimizes */
   attribute_state = save_attr;    /* ditto set_attribute */
   CALL set_attribute (new_attr);
   CALL set_cursor    (new_cp);
   RETURN;

END; /* set_cursor_and_attribute */
/*--------------------------------------------------------------------*/

chk_cursor_degradation:

   PROCEDURE;
   %REPLACE DIM_ATTRIBUTE  BY 2;

/*--------------------------------------------------------------------+
| Some terminals don't support alternate cursor types.  Here we       |
| simulates alternate cursor type by dimming the character over the   |
| cursor.  Actually we toggle the dim/bold attribute.                 |
| At present, redundant DIM_ON/DIM_OFF sequences may occur when using|
| the alternate cursor type on a 6053.  Feel free to optimize.        |
+--------------------------------------------------------------------*/

  IF CURSOR_TYPE ^= 0 THEN
     IF TERMINAL_TYPE ^= LEMITE THEN        /* Degradation necessary */
        CALL mod_set_attribute_op (DIM_ATTRIBUTE, TOGGLE, 1);
  RETURN;

END; /* chk_cursor_degradation */

/* ------------------------------------------------------------- */

mod_set_attribute_op:

   PROCEDURE (attr_state, mask, range);
   DCL (attr_state, range, save_attr_state, save_cursor, mask)   fixed;

/*--------------------------------------------------------------------+
|          This is common code for set_attribute and mod_attribute.   |
|    Surrounds range of chars with embedded attribute control chars.  |
|    Furthermore it causes the effect to become visible.              |
|    If mask = TOGGLE, attributes in range are toggled.  Otherwise    |
|    mask selects which attributes are to be SET or CLEARED.          |
+--------------------------------------------------------------------*/

   DCL (strt, stop, i, ti, modified_attr, running_attr)       fixed;

   IF attr_state = 0 THEN IF mask = TOGGLE THEN RETURN;
```

```
    IF range = 0                                  THEN RETURN;

    strt = buffer_index;
    stop = strt - 1;
    save_cursor = cursor_pos;
    IF range < 0
    THEN do;
         strt = MAX (1, strt + range);
         save_attr_state = attribute_state;
         CALL set_cursor_and_attribute (strt);
         end;
    ELSE stop = MIN (buffer_length, stop + range);

    IF strt > stop THEN RETURN;          /* this is necessary for EOL */

    /* Save attribute state at start of range */
    running_attr    = attribute_state;
    IF mask = TOGGLE /* Could be desired_state subroutine (see below) */
       THEN modified_attr = XOR (attr_state, running_attr);
       ELSE modified_attr = AND (attr_state, mask) +
                            AND (running_attr, 7 - mask); /* inverted */

    IF range >= 0 THEN save_attr_state = modified_attr;/* Final state */

    DO i = strt TO stop;
       CALL establish_attribute_in_buffer (i, modified_attr);
       CALL set_attribute (modified_attr  );
       CALL paint (i, i);
       ti = true_index (i);
       IF is_attribute_state_marker (ti + 1) THEN
          do;
          running_attr = true_buff (ti + 2);
          IF mask = TOGGLE
             THEN modified_attr = XOR (attr_state, running_attr);
             ELSE modified_attr = AND (attr_state, mask) +
                                  AND (running_attr, 7 - mask);
          end;
       /* Restore attribute */
       CALL establish_attribute_in_buffer (i + 1, running_attr);
    END;

    CALL set_attribute (save_attr_state);  /* Restore original state */
    CALL set_cursor    (save_cursor);

    RETURN;

END; /* Procedure mod_set_attribute_op */
/*---------------------------------------------------------------*/

mod_attribute:

   PROCEDURE (attr_state);
   DCL attr_state                   fixed;
   CALL set_attribute (XOR (attr_state, attribute_state));
   RETURN;

END; /* mod_attribute */
/*---------------------------------------------------------------*/

set_attribute:

   PROCEDURE (attr_state);
   DCL (attr_state, difference)    fixed;

/*---------------------------------------------------------------+
|  Wherever attr_state differs from current state, output change. |
|  This routine is analogous to set_cursor below.                 |
+---------------------------------------------------------------*/

   IF attr_state = attribute_state THEN RETURN;

```

```
   /* In MASM this rtn could be shortened by table lookup of
      what to echo!    */

   difference = XOR (attr_state, attribute_state);

   IF difference > 3                   THEN              /* Blink      */
      IF attr_state > 3              THEN CALL echo_binary (14);
                                     ELSE CALL echo_binary (15);
   IF MOD (difference, 4) > 1        THEN              /* Dim/Bold   */
      IF MOD (attr_state, 4) > 1     THEN CALL echo_binary (28);
                                     ELSE CALL echo_binary (29);
   IF MOD (difference, 2) = 1        THEN              /* Underline */
      IF MOD (attr_state,2) = 1      THEN CALL echo_binary (20);
                                     ELSE CALL echo_binary (21);
   attribute_state = attr_state;

   RETURN;

END; /* Procedure set_attribute */
/*----------------------------------------------------------------*/

set_cursor:

   PROCEDURE (where);
/*---------------------------------------------------------------+
|     Since this routine sometimes uses relative cursor positioning, |
|     cursor_pos had better correspond to the real cp--i.e. you    |
|     cannot lie.  It would simplify some code above if this      |
|     acceleration (using <- & -> for small moves) were intercepted |
|     and handled later.  With true ANSI, there would never be any |
|     advantage to relative positioning (both take 3 bytes).       |
+---------------------------------------------------------------*/
   DCL (where, i, chr, amt)  fixed;

   amt        = where - cursor_pos;
   cursor_pos = where;
   IF shadow_echo_mode ^= NO THEN RETURN;

   IF ABS (amt) > 2 THEN /* Absolute pos */
      do;
      CALL put_chr (WRITE_CURSOR_VALUE);
      CALL put_chr (MOD    (field_horiz + where, CPL));
      CALL put_chr (DIVIDE (field_horiz + where, CPL,15) + field_vert);
      end;
   ELSE      /* Do relative positioning */
      do;
      IF amt < 0 THEN chr = CURSOR_LEFT_VALUE;
                 ELSE chr = CURSOR_RIGHT_VALUE;

      DO i = 1 TO ABS (amt);
         CALL put_chr (chr);
      END;
      end;

   RETURN;

END; /* Procedure set_cursor */
/*----------------------------------------------------------------*/

read:

  PROCEDURE RETURNS (fixed);
  DCL eof          bit,
      chr          fixed,
      chr_bits     aligned bit (16) DEFINED (chr),
      input_byte   char(2)var;

   CALL flush_buffer;
   CALL BINARY_READ_STRING (channel, 1, input_byte, eof);
   chr = RANK (input_byte);
   chr_bits = chr_bits & "007F"B4;   /* And to 7 bits */
```

```
   RETURN (chr);

END; /* read */
/*-----------------------------------------------------------------*/

ERR:
  PROCEDURE (ecode);

/*-----------------------------------------------------------------+
|  ERR is for rather serious error conditions such as STACK_OVERFLOW &|
|  ipos_out_of_bounds.  It causes EDITREAD_SYS_CALL to return        |
|  immediately without execution of the final macro.                 |
+-----------------------------------------------------------------*/
  DCL ecode       fixed;

  status_code = ecode;
  state       = TERMINATE;
  GOTO ALL_DONE;            /* Non-local GOTO */

END; /* Procedure ERR */

/*-----------------------------------------------------------------*/

flush_buffer:
   PROCEDURE;

   IF LENGTH (OUTPUT_RING_BUFFER) > 0 THEN
      CALL BINARY_WRITE_STRING (channel, OUTPUT_RING_BUFFER);
   OUTPUT_RING_BUFFER = "";
   RETURN;

END; /* Procedure flush_buffer */
/*-----------------------------------------------------------------*/

put_chr:
   PROCEDURE (chr);  /* Only way to write to screen */
   DCL chr    fixed;

   IF LENGTH (OUTPUT_RING_BUFFER) = RING_BUFFER_SIZE THEN
      CALL flush_buffer;

   OUTPUT_RING_BUFFER = OUTPUT_RING_BUFFER || ASCII (chr);
   RETURN;

END; /* PROCEDURE put_chr */
/*-----------------------------------------------------------------*/
echo_binary:
  PROCEDURE (chr);
  DCL         (chr, echo_char)           fixed;

/*-----------------------------------------------------------------+
|  echo_binary is an escape for echoing control sequences.  For     |
|  example, to shift in the alternate font, echo/B a 30 followed by |
|  echo/B "N".  Normal echo would have assumed the N was visible, the |
|  cursor moved, etc!                                               |
+-----------------------------------------------------------------*/

  echo_char = chr;
  GOTO echo1;

echo:
  ENTRY (chr);

  echo_char = MOD (chr, 128);   /* Flush parity bit for now */

  IF echo_char >= 32 & echo_char < 127      /* Printable */
     THEN cursor_pos = cursor_pos + 1;
     ELSE CALL ERR (ECHO_PRINTABLE_ONLY);

  IF cursor_pos > field_size THEN CALL ERR (CONFINEMENT_VIOLATION);
```

```
echol:   /* Comes here from echob */

   IF shadow_echo_mode = NO THEN CALL put_chr (echo_char);
   ELSE shadow_code = shadow_code * 53 + echo_char;

/*-------------------------------------------------------------------+
| Shadow_code is a hash-code representing the renoition of the range  |
| of characters being shadow echoed.  I think it                      |
| will always be unique for 1, 2 or 3 character renditions.           |
| Thus Screenedit read and Editread should always work.  A better     |
| implementation would use a 32-bit shadow_code!                      |
+-------------------------------------------------------------------*/
   RETURN;
END; /* Procedure echo & echob */

/*-------------------------------------------------------------------*/
establish_attribute_in_buffer:
    PROCEDURE (where, attr);
    DCL (attr, where, i, ti, running_attr, running_attr2)        fixed;

/*-------------------------------------------------------------------+
| Establishes 'attr' as the current attribute state in buffer.  This  |
| requires scanning from the beginning of line to determine whether   |
| nothing needs doing or to embed an attribute sequence.  In case the |
| sequence is redundant, it may actually REMOVE bytes from the buffer.|
+-------------------------------------------------------------------*/

    running_attr2 = 0;
    running_attr  = running_attr2;
    ti = true_index (where);

    DO i = 1 TO ti;
       IF is_attribute_state_marker (i) THEN
          do;
          running_attr2 = running_attr;    /* Remember last two! */
          running_attr = true_buff (i + 1);
          end;
    END;

    IF is_attribute_state_marker (ti - 2) THEN
       do;
       IF running_attr2 = attr            /* Redundant--Remove it! */
          THEN buffer = SUBSTR (buffer, 1, ti-3) || SUBSTR (buffer, ti);
          ELSE CALL replace_true_buff (ti - 1, attr);
       end;
   ELSE IF running_attr ^= attr THEN
        CALL insert_attribute_seq  (ti, attr);

   RETURN;
END; /* establish_attribute_in_buffer */
/*-------------------------------------------------------------------*/

insert_attribute_seq:

   PROCEDURE (where, attr);
   DCL (where, attr)      fixed;

/*-------------------------------------------------------------------+
|  Insert attribute sequence into buffer at specified true index.     |
+-------------------------------------------------------------------*/

   CALL insert_true_buff (where, attr);
   CALL insert_true_buff (where, ATTRIBUTE_STATE_MARKER);
   RETURN;
END;
/*-------------------------------------------------------------------*/

/*-------------------------------------------------------------------+
|  Here begin several routines which reference buffer directly rather |
|  than logically.  The difference is due to embedded attribute       |
|  sequences which aren't logically there.  All these routines have   |
|  "true" in their names.                                             |
+-------------------------------------------------------------------*/
```

```
true_buff:            /* Contents of buffer given "true" index ...    */

   PROCEDURE (ti) RETURNS (fixed);     /* ...rather than "logical". */
   DCL ti                   fixed;

   RETURN (RANK (SUBSTR (buffer, ti, 1)));

END; /* true_buff */
/*-----------------------------------------------------------------*/

insert_true_buff:      /* Insert character in buffer -- primitive */

   PROCEDURE (ti, chr);
   DCL (ti, chr)            fixed;

   buffer = SUBSTR (buffer, 1, ti - 1) || ASCII (chr) ||
            SUBSTR (buffer, ti);
   RETURN;

END; /* insert_true_buff */
/*-----------------------------------------------------------------*/

replace_true_buff:      /* replace character in buffer */

   PROCEDURE (ti, chr);
   DCL (ti, chr)            fixed;

   SUBSTR (buffer, ti, 1) = ASCII (chr);
   RETURN;

END; /* replace_true_buff */
/*-----------------------------------------------------------------*/

is_attribute_state_marker:            /*  Is this a state marker? */

   PROCEDURE (ti) RETURNS (bit);
   DCL ti                   fixed;

   IF true_buff (ti) = ATTRIBUTE_STATE_MARKER THEN RETURN ("1"B);
   RETURN ("0"B);

END; /* is_attribute_state_marker */
/*-----------------------------------------------------------------*/

true_index:

   PROCEDURE (logical_index) RETURNS (fixed);

/*----------------------------------------------------------------+
|     Converts logical_buffer_index to a SUBSTR-usable index by   |
|     accounting for embedded "fat character" codes.              |
+----------------------------------------------------------------*/

   DCL (logical_index, i, result)   fixed;

   i = 1; result = 0;
   DO WHILE (i <= logical_index);
      result = result + 1;
      IF (result <= LENGTH (buffer)) &
         (true_buff (result) = ATTRIBUTE_STATE_MARKER )
         THEN result = result + 1;
         ELSE i      = i + 1;
   END;
   RETURN (result);
END; /* true_index */

END; /* Procedure Editread_sys_call */
```

```
/*----------------------+
| Error codes:          |
+----------------------*/

%REPLACE VERSION_INCOMPATIBILITY    BY 233;   /* Status codes */
%REPLACE ILLEGAL_USER_VARIABLE      BY 238;
%REPLACE ILLEGAL_USE_OF_XEQ         BY 239;
%REPLACE CONFINEMENT_VIOLATION      BY 240;
%REPLACE ILLEGAL_OPERATION          BY 241;
%REPLACE STACK_UNDERFLOW            BY 242;
%REPLACE STACK_OVERFLOW             BY 243;
%REPLACE BUFFER_OVERFLOW            BY 244;
%REPLACE IPOS_OUT_OF_BOUNDS         BY 245;
%REPLACE DELIMITER_TYPED            BY 246;
%REPLACE ILLEGAL_FIELD_LOCATION     BY 247;
%REPLACE ECHO_PRINTABLE_ONLY        BY 248;

%REPLACE TERMINATE                  BY 60;     /* State code */
```

```
/*--------------------+
| Editing Table DCLs |
+--------------------*/

DCL CHANNEL_DATA_ADDRESS          pointer static external;

DCL 1 CHANNEL_DATA                BASED (CHANNEL_DATA_ADDRESS),
      2 initial_macro_size        fixed,
      2 final_macro_size          fixed,
      2 echo_macro_start          fixed,
      2 echo_macro_size           fixed,
      2 macro_table_size          fixed,
      2 number_states             fixed,
      2 macro_table_address       pointer,
      2 dispatch_table_address    pointer;

DCL MACRO_TABLE                   aligned char (macro_table_size)
                                  based (macro_table_address);

DCL DISPATCH_TABLE                (0:number_states) fixed
                                  based (dispatch_table_address);
```

```
/*--------------------------+
| Packet for Extended Read |
+--------------------------*/

/* Any change to this packet must correspond to changes in Replaces
   in Replaces.in and to changes in the dispatch table in the code. */

DCL 1 PACKET                      BASED (packet_address),
                                        /* This much MbFU'd from user */
      2 user_packet,
       3 channel                    fixed,
       3 BUFFER_ADDRESS             pointer,
       3 INSERTION_BUFFER_ADDRESS   pointer,
       3 INSERTION_BUFFER_SIZE      fixed,
       3 USER_ARRAY_ADDRESS         pointer,
       3 USER_ARRAY_SIZE            fixed,

       3 V0                       fixed,    /* R/W vars start here */
       3 insert_mode              fixed,
       3 delimiter_length         fixed,
       3 delimiter                fixed,
       3 state                    fixed,
       3 status_code              fixed,
       3 buffer_index             fixed,
       3 max_buffer_size          fixed,   /* Last read-write var */
       3 field_size               fixed,   /* First read-only var */
```

```
27 |        3 already_displayed      fixed,
28 |        3 attribute_state        fixed,
29 |        3 buffer_length          fixed,
30 |        3 cursor_pos             fixed,
31 |        3 char                   fixed,
32 |        3 echo_index             fixed,
33 |        3 visible_eol            fixed,   /* Where line ends visibly */
34 |        3 field_vert             fixed,
35 |        3 field_horiz            fixed,   /* Last referencable variable */
36 |      2 UNUSED_RESERVED          pointer;
37 |
38 | DCL 1 PACKET_OVERLAY2           BASED (packet_address),
39 |      2 variable_start_offset    (6) fixed,
40 |      2 packet_array             (19) fixed; /* where variables start    */
41 |
42 |
43 | DCL OPERATOR_DISPATCH_TABLE (0:255) fixed static external initial
44 |    (1, 1, 1, 1, 1,    1, 1, 1, 1, 1,    1, 1, 1, 1, 1,    1, 1, 1, 1, 1,
45 |     1, 1, 1, 1, 1,    1, 1, 1, 1, 1,    1, 1, 1, 1, 1,    1, 1, 1, 1, 1,
46 |     1, 1, 1, 1, 1,    1, 1, 1, 1, 1,    1, 1, 1, 1, 1,    1, 1, 1, 1, 1,
47 |     1, 1, 1, 1, 1,    4, 4, 4, 4, 4,    4, 4, 4, 4,53,    4, 4, 4,50, 4,
48 |     4, 4, 4,53,53,   53,53,53,53,53,   53,53,53,53,53,   53,10,51,10,10,
49 |    10,10,32,53,53,   53,53,53,53,53,   53,53,53,53,53,   53,53,53, 5, 6,
50 |     7, 8, 2, 3,53,   53,53,53,53,53,   53,53,53,53, 9,   11,12,15,14,53,
51 |    16,17,18,19,20,   21,22,23,24,25,   26,27,28,29,30,   31,33,13,53,53,
52 |    53,53,53,53,52,   52,52,52,52,52,   52,52,52,52,52,   52,52,52,52,52,
53 |    52,52,52,52,52,   52,52,52,52,52,   52,52,52,52,52,   52,52,52,52,52,
54 |    52,52,52,52,52,   53,53,53,53,53,   53,53,53,53,53,   53,53,53,53,53,
55 |    34,35,36,37,38,   39,40,41,42,43,   44,45,46,47,48,   49,53,53,53,53,
56 |    53,53,53,53,53,   53,53,53,53,53,   53,53,53,53,53,   53);
57 |
58 | /* Code for above:  53 is ILLEGAL_OP, 52 is 1-byte CGOTO, 1 is a
59 |    number constant, 4 is a regular variable reference, 10 is a regular
60 |    variable assignment, 51 is assign_insert_mode, 32 assign buf index,
61 |    50 is a reference to char, 54 is code for -1, 15 is MINUS_OP. */
```

```
                    /*=========================+
                    |  Replaces for OPs & VARs  |
                    +=========================*/

 5 | /* Any change to the _VARs below must correspond to a change in
 6 |    the packet defined in packet.in.  Similarly any change in
 7 |    an OP-code must correspond to a change in OPERATOR_DISPATCH_TABLE
 8 |    also defined in packet.in.  */
 9 |
10 | %REPLACE SET_OFFSET           BY 31 ;  /* Any variable with this added is to
11 |                                           be treated as a Set of itself */
12 |
13 | %REPLACE BLINK_LITERAL           BY 4;
14 | %REPLACE DIM_LITERAL             BY 2;
15 | %REPLACE UNDERLINE_LITERAL       BY 1;
16 |
17 | %REPLACE HIGHEST_CONSTANT     BY 64;
18 |
19 | %REPLACE LOWEST_READ_WRITE_VAR BY 65;
20 | %REPLACE VO_VAR                BY 65;   /*  96 if Set */
21 | %REPLACE INSERT_MODE_VAR       BY 66;   /*  97 if Set */
22 | %REPLACE DELIMITER_LENGTH_VAR BY 67;    /*  98 if Set */
23 | %REPLACE DELIMITER_VAR         BY 68;   /*  99 if Set */
24 | %REPLACE STATE_VAR             BY 69;   /* 100 if Set */
25 | %REPLACE STATUS_CODE_VAR       BY 70;   /* 101 if Set */
26 | %REPLACE BUFFER_INDEX_VAR      BY 71;   /* 102 if Set */
27 | %REPLACE HIGHEST_READ_WRITE_VAR BY 71;
28 | %REPLACE MAX_BUFFER_SIZE_VAR  BY 72;
29 | %REPLACE FIELD_SIZE_VAR       BY 73;
30 |                                  /* Gap: Already_displayed and unused */
31 | %REPLACE ATTRIBUTE_STATE_VAR  BY 75;
32 | %REPLACE BUFFER_LENGTH_VAR    BY 76;
33 | %REPLACE CURSOR_POS_VAR       BY 77;
34 | %REPLACE CHAR_VAR             BY 78;
```

```
35 | %REPLACE ECHO_INDEX_VAR       BY 79;
36 | %REPLACE VISIBLE_EOL_VAR      BY 80;
37 | %REPLACE FIELD_VERT_VAR       BY 81;
38 | %REPLACE FIELD_HORIZ_VAR      BY 82;
39 |                                          /* Remaining codes are stored separately */
40 | %REPLACE COL_VAR              BY 84;
41 | %REPLACE ROW_VAR              BY 85;
42 | %REPLACE CPL_VAR              BY 86;
43 | %REPLACE LPP_VAR              BY 87;
44 | %REPLACE CURSOR_TYPE_VAR      BY 88;
45 |
46 | %REPLACE END_OF_VARS          BY 88;
47 |
48 | /* Leave gap here for SET_OPs--see above range of 96 to 102 */
49 |
50 | %REPLACE STRT_0ARG_OPS        BY 118;    /* Take no args */
51 | %REPLACE ECHO_CHAR_OP         BY 118;    /* These 2 ops are internal only*/
52 | %REPLACE INSERT_CHAR_OP       BY 119;    /* and supplied for speed.      */
53 | %REPLACE DELIMIT_OP           BY 120;
54 | %REPLACE BELL_OP              BY 121;
55 | %REPLACE NUMBER_OP            BY 122;
56 | %REPLACE VARIABLE_OP          BY 123;
57 | %REPLACE END_0ARG_OPS         BY 123;
58 |
59 | %REPLACE STRT_1ARG_OPS        BY 134;    /* Take 1 arg */
60 |
61 | %REPLACE ECHOB_OP             BY 134;    /* Echo exactly (binary) */
62 | %REPLACE INSERT_OP            BY 135;
63 | %REPLACE MOVE_OP              BY 136;
64 | %REPLACE MINUS_ONE_OP         BY 137;
65 | /* %REPLACE MOVEB_OP          BY 137;    removed 8-81 */
66 | %REPLACE DELETE_OP            BY 138;
67 | /* %REPLACE DELETEB_OP        BY 139;    removed 8-81 */
68 | %REPLACE SEARCH_OP            BY 140;
69 | %REPLACE SEARCHB_OP           BY 141;
70 | %REPLACE SEARCHN_OP           BY 142;
71 | %REPLACE SEARCHBN_OP          BY 143;
72 | %REPLACE BUFFER_OP            BY 144;
73 | %REPLACE ECHO_OP              BY 145;
74 | %REPLACE TAB_OP               BY 146;
75 | %REPLACE NOT_OP               BY 147;
76 | %REPLACE UGOTO_OP             BY 148;    /* 2-byte unconditional jump */
77 | %REPLACE GOTO_OP              BY 149;    /* 2-byte conditional jump   */
78 | %REPLACE POP_OP               BY 150;    /* Pops stack                */
79 | %REPLACE INS_BUF_OP           BY 151;
80 | %REPLACE SET_OP               BY 152;
81 | %REPLACE ECHO_SET_ATTRIBUTE_OP BY 153;
82 | %REPLACE ECHO_MOD_ATTRIBUTE_OP BY 154;
83 | %REPLACE SET_CURSOR_TYPE_OP   BY 155;
84 | %REPLACE DATA_OP              BY 156;
85 | %REPLACE MINUS_OP             BY 157;
86 | %REPLACE END_1ARG_OPS         BY 157;
87 |
88 | %REPLACE GOTO_OP_START        BY 164;    /* Start of 1-byte conditional
89 |                                             jump range (negative)     */
90 | %REPLACE GOTO_OP_DIVISION     BY 184;    /* Separates back/forward jumps*/
91 | %REPLACE GOTO_OP_END          BY 204;    /* End of 1-byte conditional
92 |                                             jump range (positive)     */
93 |
94 |
95 | %REPLACE STRT_2ARG_OPS        BY 220;    /* Take 2 args */
96 | %REPLACE ADD_OP               BY 220;
97 | %REPLACE SUB_OP               BY 221;
98 | %REPLACE MUL_OP               BY 222;
99 | %REPLACE DIV_OP               BY 223;
100 | %REPLACE MOD_OP              BY 224;
101 | %REPLACE EQ_OP               BY 225;
102 | %REPLACE NE_OP               BY 226;
103 | %REPLACE GT_OP               BY 227;
104 | %REPLACE GE_OP               BY 228;
105 | %REPLACE LT_OP               BY 229;
106 | %REPLACE LE_OP               BY 230;
```

```
%REPLACE AND_OP              BY 231;
%REPLACE OR_OP               BY 232;
%REPLACE XEQ_OP              BY 233;
%REPLACE MOD_ATTRIBUTE_OP    BY 235;
%REPLACE END_2ARG_OPS        BY 235;

%REPLACE SET_ATTRIBUTE_OP    BY 234;    /* 3-arg op!!! */

/* REPLACES for other things: */

%REPLACE ATTRIBUTE_STATE_MARKER BY 128;  /* Special character! */
```

```
                           /*-----------------------+
                           |     Terminal_data.in    |
                           +-----------------------*/

/* Contains data specific to the terminal.  This data should persist
   across all reads, even reads of a different type.  Some of this
   information corresponds to terminals characteristics and is static*/

/* CURRENT_ROW is the current terminal row.  As yet, I don't account
   for scrolling, vertically or horizontally.  This addition should
   be straightforward. */

%REPLACE LEMITE          BY 6130;
%REPLACE DEFAULT_LPP     BY 24;
%REPLACE DEFAULT_CPL     BY 80;

DCL LPP                       fixed static external initial (DEFAULT_LPP),
    CPL                       fixed static external initial (DEFAULT_CPL),
    CURSOR_TYPE               fixed static external initial (0),
   (CURRENT_ROW, CURRENT_COL, TERMINAL_TYPE)
                              fixed static external initial (0);
```

APPENDIX B

Appendix B contains the source text for Default Table 801. The source text is labelled DEFAULT_TABLE.

```
%             This is one proposal for the DEFAULT Editread Table
%                              Oct 05, 1981

% 0.     Features:  Attribute dragging, underflow check, control
%        over when the read should terminate, function keys
%        handled uniformly, superquoting.  Editing operations include
%        move left, move right, toggle insert/overstrike mode,
%        delimit, character search left, character search right,
%        move to home (or eol if already at home), erase eol,
%        delete whole line, insert and overstrike,
%        delete backwards (the "Del" key) and delete by search.

%        Assignment of keys to these operations is the same as
%        for AOS Screenedit read where equivalent (or similar)
%        behavior is expected.

%        User variables are used to impart some degree of control.
%        In all cases, a value of 0 has a reasonable default meaning.

% 1.     Termination control.  If V0 is 0, an attempt to move or
%        delete a character which fails will "beep".  If V0 is not zero,
%        the read will terminate with a status_code as shown below.

%              Status-code           Meaning
%                 1               Move right past EOL
%                 2               Move left at BOL
```

```
%                 3                   Deletion at beginning of line
%                 4                   Function key struck

%        Function keys are ignored if V0 is 0.  Otherwise they are
%        delimiters.  Both codes are consumed.  The second character of
%        the sequence is returned in 'char'.


% 2.     Underflow.  If buffer_length ever becomes shorter than V1,
%        then the read terminates (to facilitate "word-wrap" editors).
%        Checking for this is done in the deletion operations.

% 3.     V2 indicates which attributes are being dragged.  It may be set
%        when the read is posted.  The low order bit of V2 controls
%        the Underline attribute; the 2-bit, the Dim/Bold attribute;
%        the 4-bit, the Blink attribute.
%        In all cases, the attribute is toggled as it is dragged.


INITIAL MACRO: [Set_cursor_type insert_mode]
FINAL MACRO:   %% None

ECHO MACROS:
20,7F:  [Echo char]                                    % Normal char
09,09:  [Do [Echo " "] while [Mod cursor_pos 8]]       % Tab
00,1F:  [Echo_mod_attribute Blink][Echo [Add "@" char]] % Cntrl chr

%%%%%%%%%%%%%%%%%%%%%%%%%%%%%%%%%%%%%%%%%%%%%%%%%%%%%%%%%%%%%%%%%%%%%

STATE=0

20,7E:  [Insert char][Mod_attribute V2 -1]             % Printable char


%% Delete at beginning of line terminates read if V0 is set.
%% The [Xeq 6 0] checks for line underflow.

7F,7F:  [If [Delete -1] Then [Xeq 6 0]                  % Del key
                        Else [Xeq 5 3]]  % (Chk BOL)

%% Both movement macros drag the current attribute.
%% Our model of attribute use shows the cursor just to the right of
%% the border between an attribute region and non-attribute region.

18,18:  [If [Move 1] Then [Mod_attribute V2 -1]             % ->
                     Else [Xeq 5 1]]

19,19:  [If [Move -1] Then [Mod_attribute V2 1]             % <-
                      Else [Xeq 5 2]]


%% Unlike AOS Screenedit, ^A reveals the hidden priming as often
%% as requested.  ^H is used to move to beginning and end of line.

01,01:  [Set V3 1]                               % ^A: Reveal
        [While [Ge [Set V4 [Insertion_buffer V3]] 0]
            Do [Insert V4]
               [Set V3 [Add V3 1]] ]

08,08:  [Set V3 [Sub [If [Eq buffer_index 1]   % ^H: toggle end of line
                       Then [Add buffer_length 1]
                       Else 1]
                  buffer_index] ]
        [Mod_attribute V2 [Minus [Move V3]] ]

%% Toggle insert mode via ^E.  Show mode via alternate cursor type.

05,05:  [Set insert_mode [Set_cursor_type [Not insert_mode]]]     % ^E

%% "Word" forward and back are provided via ^F and ^B.
```

```
07,02:  [Set state 1]                                  % ^B, Search Back
06,06:  [Set state 2]                                  % ^F, Search Forward

0B,0B:  [Delete buffer_length] [Xeq 6 0]               % ^K, Erase EOL

09,09:  [Insert char]                                  % ^I, Tab
10,10:  [Set state 3]                                  % ^P, Superquote
15,15:  [Set buffer_index 1][Delete buffer_length]     % ^U, Erase line
        [Xeq 6 0]   % Chk underflow

1E,1E:  [Set state 4]                                  % F_key hdr
0A,0F:  [Delimit]                                      % NL, EOL, ^L, CR

%%%%%%%%%%%%%%%%%%%%%%%%%%%%%%%%%%%%%%%%%%%%%%%%%%%%%%%%%%%%%%%%%%%%%%%%%%%%%

STATE=1       %% Search backward for this character

00,FF:  [Mod_attribute V2 [Minus [Search/B char]]]
        [Set state 0]                                  % Rest of ^B

%%%%%%%%%%%%%%%%%%%%%%%%%%%%%%%%%%%%%%%%%%%%%%%%%%%%%%%%%%%%%%%%%%%%%%%%%%%%%

STATE=2       %% Search forward for this character

00,FF:  [Mod_attribute V2 [Minus [Search   char]]]
        [Set state 0]                                  % Rest of ^F

%%%%%%%%%%%%%%%%%%%%%%%%%%%%%%%%%%%%%%%%%%%%%%%%%%%%%%%%%%%%%%%%%%%%%%%%%%%%%

STATE=3       %% Superquote  (Interpret next character normally, not
              %% as an "Editing" character.

00,FF:  [Insert char][Set state 0]

%%%%%%%%%%%%%%%%%%%%%%%%%%%%%%%%%%%%%%%%%%%%%%%%%%%%%%%%%%%%%%%%%%%%%%%%%%%%%

STATE=4       %% Function key block (Either ignores (V0=0) or generates
              %% a status_code of 4 leaving the F-key indicated by char.

00,FF:  [Xeq 5 4][Set state 0]

%%%%%%%%%%%%%%%%%%%%%%%%%%%%%%%%%%%%%%%%%%%%%%%%%%%%%%%%%%%%%%%%%%%%%%%%%%%%%

STATE=5       %% Subroutine to determine whether to terminate or not.

00,FF:  [If V0 Then [Set status_code char] [Set state Terminate]
             Else [Bell] ]

%%%%%%%%%%%%%%%%%%%%%%%%%%%%%%%%%%%%%%%%%%%%%%%%%%%%%%%%%%%%%%%%%%%%%%%%%%%%%

STATE=6       %% Underflow check:  when visible line short enough, stop.

00,00:  [If [Lt visible_eol V1]                        % Room for new wrd?
             Then [Set status_code 3][Set state Terminate]]
```

What is claimed is:

1. In a data processing system, editing means for modifying data codes comprising:

(1) receiving means for receiving input codes in said editing means;

(2) memory means including (a) buffer memory means for storing said data codes, (b) control data memory means for storing at least state data specifying the state of said editing means, and (c) editing table memory means for storing an editing table including (i) editing instruction sequences corresponding to said input codes for specifying editing operations modifying said data codes in said buffer memory means, and (ii) a plurality of sections containing said editing instruction sequences, each said section corresponding to one value of said state data; and (3) processing means connected to said receiving means and said memory means including (a) means for receiving said input codes from said receiving means, (b) for each said input code and one said value of said state data, means for determining the location of said corresponding said section corresponding to said one said value and means for determining the location of said editing instruction sequence corresponding to said input code in said corresponding said section, (c) means for receiving said editing instructions of said corresponding said editing instruction sequence, and (d) means for responding to said editing instructions of said corresponding said editing instruction sequence by modifying said data codes in said buffer memory means, whereby said data codes are modified by said processing means in response to said input codes.

2. In the editing means of claim 1, and wherein: said plurality of sections includes four sections and said state data may have four values.

3. In the editing means of claim 1, and wherein: said plurality of sections includes more than four sections and said state data may have one value corresponding to each section of said plurality of sections.

4. In the editing means of claim 1, and wherein: first certain said editing instruction sequences include state editing instructions for setting said state values of said state data.

5. In the editing means of claim 4, and wherein: said input codes include control input codes; second certain said editing instructions of said first certain editing instructions correspond to said control input codes; and said processor means including means for responding to said second certain said editing instructions corresponding to one said control input code by setting said state value as specified by said corresponding said second certain editing instructions and receiving a next input code from said receiving means, whereby a said control code determines the manner in which said editing means responds to said next input code.

6. In the editing means of claim 1, and wherein: said editing table further includes (ii) an initial portion containing a said editing instruction sequence for execution by said processing means at commencement of operation of said editing means and (iii) a final portion containing a said editing instruction sequence for execution by said processing means at termination of operation of said editing means.

7. In the editing means of claim 1, 2, 3, 4, 5, or 6, and wherein:

said data processing system includes (1) processor means responsive to instructions for processing data including said data codes and said input codes, (2) memory means responsive to memory signals from said processor means for storing said data and sequences of said instructions, (3) means under control of said processor means for transferring said data between said memory means and said processor means, transferring said input codes from said receiving means to said memory means, transferring said instructions from said memory means to said processor means, and transferring said memory signals from said processor means to said memory means;

said buffer memory means is contained in said memory means; said editing table memory means is contained in said memory means;

said control data memory means is contained in said memory means;

said instruction sequences include an editing means instruction sequence.

8. In the editing means of claim 1, 2, 3, 4, 5, or 6, and wherein:

said data processing system includes (1) first processor means responsive to first instructions for processing first certain data including said data codes, (2) second processor means responsive to second instructions for processing second certain data including said data codes and said input codes, (3) memory means responsive to memory signals from said first processor means and from said second processor means for storing said first certain data, said second certain data, first certain instruction squences containing said first instructions and second certain instruction sequences containing said second instructions, (4) means under control of said first processor means for transferring said first certain data between said memory means and said first processor means, said first instructions between said memory means and said first processor means, and said memory signals from said first processor means to said memory means, and (5) means under control of said second processor means for transferring said input codes from said receiving means to said memory means, transferring said second certain data between said memory means and said second processor means, transferring said second instructions from said memory means to said second processor means, and transferring said memory signals from said second processor means to said memory means;

said buffer memory means is contained in said memory means; said editing table memory means is contained in said memory means;

said control data memory means is contained in said memory means;

said second certain instruction sequences include an editing means instruction sequence.

9. In the editing means of claim 1, 2, 3, 4, 5, or 6, and wherein:

said data processing system includes (1) first processor means responsive to first instructions for processing first certain data including said data codes, (2) first memory means responsive to memory signals from said first processor means for storing said first certain data and first instruction sequences containing said first instructions, (3) terminal means for receiving said input codes in said data processing system, including (a) terminal receiving means for receiving said input codes, (b) second processor means responsive to second instructions for processing second certain data including said data codes and said input codes, (c) second memory for storing said second certain data and second instruction sequences containing said second instructions, and (d) means under control of said second processor means for receiving said input codes from said terminal receiving means, transferring said second certain data between said second memory means and said second processor means, and transferring said second instructions from said second memory means to said second processor means, and
ı means under control of said first processor means for transferring said first certain data between said first memory means and said second memory means;
id buffer memory means is contained in said second memory means;
id editing table memory means is contained in said second memory means;
id control data memory means is contained in said second memory means;
ıd second certain instruction sequences include an editing means instruction sequence;
ıid receiving means is said terminal receiving means.

10. In the editing means of claim 9, and wherein:
ıid first certain data further includes
(a) at least one said editing table and
(b) external control data;
aid editing table stored in said editing table memory means is a said editing table from said first certain data; and
:ertain data in said control data is from said external control data.

11. In the editing means of claim 1, 2, 3, 4, 5, or 6, and wherein:
said data processing system includes
(1) processor means responsive to instructions for processing data including said input codes and said data codes,
(2) memory means responsive to memory signals from said processor means for storing said data and instruction sequences containing said instructions,
(3) means under control of said processor means for transferring said data between said memory means and said processor means, transferring said input codes from said receiving means to said processor means, transferring said instructions from said memory means to said processor means, and transferring said memory signals from said processor means to said memory means,
(4) in said memory means, a plurality of process state memory means for retaining state data for executions of said instruction sequences for a user of said data processing system, said state data including at least the location in said memory means of the next said instruction to be executed in one of said instruction sequences, and
(5) in said instruction sequences, a process manager instruction sequence for temporarily associating one said process state memory means with said processor means and thereby causing said processor means to execute said instructions in said one of said instruction sequences for said user; said buffer memory means is contained in said memory means and associated with one said process state memory means;
said control data memory means is contained in said memory means and associated with one said process state memory means;
said editing table memory means is contained in said memory means;
said instruction sequences include an editing means instruction sequence.

12. In a data processing system, editing means for modifying data codes and displaying sequences of visual representations comprising:
(1) receiving means for receiving input codes in said editing means;
(2) display means for displaying said sequences of visual representations in response to display codes,
(3) memory means including
(a) buffer memory means for storing said data codes,
(b) control data memory means for storing at least state data specifying the state of said editing means, and
(c) editing table memory means for storing an editing table containing editing instruction sequences including
(i) editing instruction sequences corresponding to said input codes and to said data codes
(ii) a plurality of sections containing said editing instructions, each said section corresponding to one value of said state data, said sections including at least a display section corresponding to an echo value of said state data, and said display section containing said editing instruction sequences specifying operations producing sequences of said display codes; and
(4) processing means connected to said receiving means, to said display means, and to said memory means including
(a) means for receiving said input codes from said receiving means,
(b) for each said input code and a said state value, means determining the location of a corresponding said section corresponding to said state value and of said editing instruction sequence corresponding to said input code in said corresponding said section,
(c) means for receiving said editing instructions of said corresponding said editing instruction sequence in said corresponding said section,
(d) means for responding to said editing instructions of said corresponding said editing instruction sequence modifying said data codes in said buffer memory means,
(e) means for receiving data codes from said buffer memory means,
(f) for each said data code,
(i) means for setting said state value to an echo value,
(ii) means determining the location of said editing instruction sequence corresponding to said data code in said display section, and
(iii) means for receiving said editing instructions of said corresponding said editing instruction sequence in said display section and responding to said editing instructions of said corresponding said editing instruction sequence by producing a sequence of said display codes and causing said display means to respond to said certain sequence of said display codes, whereby said data codes are modified by said processing means in response to said input codes and said visual representations corresponding to said modified said data codes are displayed on said display means in response to said data codes.

13. In the editing means of claim 12, and wherein: said plurality of sections includes four sections and said state data may have four values.

14. In the editing means of claim 12, and wherein: said plurality of sections includes more than four sections and said state data may have one value corresponding to each section of said plurality of sections.

15. In the editing means of claim 12, and wherein: certain said editing instruction sequences include state change editing instructions for changing said values of said state data.

16. In the editing means of claim 15, and wherein:
said input codes include control input codes;
second certain said editing instructions of said first certain editing instructions correspond to said control input codes;
said processor means including means for responding to said second certain said editing instructions corresponding to a said control input code for setting said state value as specified by said corresponding said second certain editing instructions and receiving a next input code from said receiving means,
whereby a said control code determines the manner in which said editing means responds to said next input code.

17. In the editing means of claim 12, and wherein: said editing table includes
(iii) an initial portion containing a said buffer editing instruction sequence for execution by said processing means at commencement of operation of said editing means and
(iv) a final portion containing a said buffer editing instruction sequence for execution by said processing means at termination of operation of said editing means.

18. In the editing means of claims 12, 13, 14, 15, 16, or 17, and wherein:
said data processing system includes
(1) processor means responsive to instructions for processing data including said data codes, said input codes, and said display codes,
(2) memory means responsive to memory signals from said processor means for storing said data and sequences of said instructions,
(3) means under control of said processor means for transferring said data between said memory means and said processor means, transferring said input codes from said receiving means to said memory means, transferring said display codes from said memory means to said display means, transferring said instructions from said memory means to said processor means, and transferring said memory signals from said processor means to said memory means;
said buffer memory means is contained in said memory means; said control data memory means is contained in said memory means;
said editing table memory means is contained in said memory means;
said instruction sequences include an editing means instruction sequence.

19. In the editing means of claims 12, 13, 14, 15, 16, or 17, and wherein:
said data processing system includes
(1) first processor means responsive to first instructions for processing first certain data including said data codes,
(2) second processor means responsive to second instructions for processing second certain said data including said data codes, said input codes, and said display codes,
(3) memory means responsive to memory signals from said first processor means and from said second processor means for storing said first certain data, said second certain data, first certain instruction sequences containing said first instructions, and second certain instruction sequences containing said second instructions,
(4) means under control of said first processor means for transferring said first certain data between said memory means and said first processor means, said first instructions between said memory means and said first processor means, and said memory signals from said first processor means to said memory means, and
(5) means under control of said second processor means for transferring said input codes from said receiving means to said memory means, transferring said second certain data between said memory means and said second processor means, transferring said second instructions from said memory means to said second processor means, transferring said display codes from said memory means to said display means, and transferring said memory signals from said second processor means to said memory means;
said buffer memory means is contained in said memory means; said control data memory means is contained in said memory means;
said editing table memory means is contained in said memory means;
said second certain instruction sequences include an editing means instruction sequence.

20. In the editing means of claims 12, 13, 14, 15, 16, or 17, and wherein:
said data processing system includes
(1) first processor means responsive to first instructions for processing first certain data including said data codes,
(2) first memory means responsive to memory signals from said first processor means for storing said first certain data and first certain instruction sequences containing said first instructions,
(3) terminal means for receiving said input codes to said data processing system and displaying said sequences of visual representations, said terminal means including
(a) terminal receiving means for receiving said input codes,
(b) terminal display means for displaying said sequences of visual representations in response to said display codes,
(c) second processor means responsive to second instructions for processing second certain data including said input codes, said data codes, and said display codes,
(d) second memory for storing said second certain data and second certain instruction sequences containing said second instructions, and
(e) means under control of said second processor means for obtaining said input codes from said terminal receiving means, causing said terminal display means to respond to said sequences of display codes, transferring said second certain data between said second memory means and said second processor means, and transferring said second instructions from said second memory means to said second processor means, and
(4) means under control of said first processor means for transferring said first certain data between said first memory means and said second memory means;
said buffer memory means is contained in said second memory means;
said control data memory means is contained in said second memory means;
said editing table memory means is contained in said second memory means;
said second certain instruction sequences include an editing means instruction sequence;
said display means is said terminal display means;

said receiving means is said terminal receiving means.

21. In the editing means of claim 20, and wherein:
said first certain data further includes at least one said editing table and said editing table stored in said editing table memory means is a said editing table from said first certain data.

22. In the editing means of claim 12, 13, 14, 15, 16, or 17, and wherein:
said data processing system includes
(1) processor means responsive to instructions for processing data including said input codes, said data codes, and said display codes,
(2) memory means responsive to memory signals from said processor means for storing said data and instruction sequences containing said instructions,
(3) means under control of said processor means for transferring said data between said memory means and said processor means, transferring said input codes from said receiving means to said processor means, transferring said display codes to said display means, transferring said instructions from said memory means to said processor means, and transferring said memory signals from said processor means to said memory means,
(4) in said memory means, a plurality of process state memory means for retaining state data for executions of said instruction sequences for a user of said data processing system, said state data including at least the location in said memory means of the next said instruction to be executed in one of said instruction sequences, and
(5) in said instruction sequences, a process control instruction sequence for temporarily associating one said process state memory means with said processor means and thereby causing said processor means to execute said instructions in said one of said instruction sequences for said user;
said buffer memory means is contained in said memory means and is associated with one said process state memory means;
said control data memory means is contained in said memory means and associated with one said process state storage means;
said editing table memory means is contained in said memory means;
said instruction sequences include an editing means instruction sequence.

23. In the editing means of claim 1, 2, 3, 4, 5, 6, 12, 13, 14, 15, 16, or 17, and wherein:
certain said editing instruction sequences include
(a) a range specifier specifying which of said input codes or said data codes correspond to said editing instruction sequence,
(b) a size specifier specifying a number of bytes in said editing instruction sequence, and
(c) at least one said editing instruction.

24. In the editing means of claim 1, 2, 3, 4, 5, 6, 12, 13, 14, 15, 16, or 17, and wherein:
certain said editing instructions include
(a) at least one operand byte representing certain data to be operated on by said processing means and
(b) a single operation code byte,
said at least one operand byte in said second certain said editing instructions precedes said single operation code byte,
said memory means further includes operand memory means for storing said certain data represented by said operand bytes, and
said processing means responds to a said certain said editing instruction by fetching said at least one operand byte, storing said certain data represented by said operand byte in said operand memory means, and on execution of said operation code byte, fetching said certain data from said operand memory means and using it in said execution of said operation code byte.

25. In the editing means of claim 1, 2, 3, 4, 5, 6, 12, 13, 14, 15, 16, or 17, and wherein
said editing table memory means includes writable memory means, whereby users of said editing means may alter said editing table or may provide a new said editing table for said editing means.

26. In the editing means of claim 1, 2, 3, 4, 5, 6, 12, 13, 14, 15, 16, or 17, and wherein
said editing table memory means includes read-only memory means containing a said editing table which may not be altered by users of said editing means.

27. In the editing means of claim 1, 2, 3, 4, 5, 6, 12, 13, 14, 15, 16, or 17, and wherein
said editing table memory means includes a plurality of said editing tables,
each said editing table has an associated editing table identifier value,
said memory means further includes editing table identifier memory means for storing a single said editing table identifier value, and
said processing means includes means for responding to said editing table identifier value by locating one of said plurality of editing tables.

28. In the editing means of claim 27, and wherein: said editing table memory means includes
(a) writable memory means and
(b) read-only memory means, and
said plurality of said editing tables includes
(a) writable editing tables contained in said writable memory means and
(b) read-only editing tables contained in said read-only memory means.

29. In a data processing system, the method of employing processing means responsive to state values contained in control data in memory accessible to said processing means and to editing instructions in editing instruction sequences contained in sections corresponding to said state values in an editing table in memory accessible to said processing means to modify data codes contained in a buffer in memory accessible to said processing means in response to input codes received by said processing means from receiving means accessible to said processing means, said method comprising the steps of:
(1) receiving one input code of said input codes from said receiving means in said processing means;
(2) determining in said processing means the address of a corresponding said editing instruction sequence corresponding to said one input code in a corresponding said section corresponding to said state value in said editing table using said input code and said state value;
(3) receiving said editing instructions from said corresponding said editing instruction sequence in said corresponding said section of said editing table in said processing means; and
(4) responsive to said editing instructions in said corresponding said editing instruction sequence, modifying by means of said processing means first certain data codes of said data codes.

30. In a data processing system, the method of employing processing means to modify data codes contained in a buffer in memory accessible to said processing means in response to input codes including control codes received by said processing means from receiving means accessible to said processing means, said processing means being responsive to state values contained in control data in memory accessible to said processing means and to editing instructions in editing instruction sequences contained in sections corresponding to said state values in an editing table in memory accessible to said processing means, said editing instruction sequences including certain editing instruction sequences for setting said state values, and said method comprising the steps of:

(1) receiving one input code of said input codes from said receiving means in said processing means;
(2) determining in said processing means the location of a corresponding said editing instruction sequence corresponding to said one input code in a corresponding said section corresponding to said state value using said input code and said state value;
(3) receiving said editing instructions from said corresponding said editing instruction sequence in said corresponding said section of said editing table in said processing means;
(4) if said one input code is a said control code, responsive to said certain editing instructions in said corresponding said editing instruction sequence, setting said state value to a new state value;
(5) receiving a next input code of said input codes from said receiving means in said processing means;
(6) determining in said processing means the address of a corresponding said editing instruction sequence corresponding to said next input code in a corresponding said section corresponding to said new state value in said editing table using said next input code and said new state value;
(7) receiving said editing instructions from said corresponding said editing instruction sequence for said next input code in said corresponding said section of said editing table for said new state value in said processing means; and
(8) responsive to said editing instructions in said processing means, modifying by means of said processing means first certain data codes of said data codes.

31. In a data processing system, the method of employing processing means to modify. data codes contained in a buffer in memory accessible to said processing means in response to input codes received by said processing means from receiving means accessible to said processing means and to display visual representations on display means accessible to said processing means and responsive to display codes, said processing means being responsive to state values including at least an echo state value contained in control data in memory accessible to said processing means and to editing instructions in editing instruction sequences in an editing table in memory accessible to said processing means, said editing instruction sequences being contained in sections in said editing table corresponding to said state values and said sections including at least a display section corresponding to said echo value, and said method comprising the steps of:

(1) receiving one input code of said input codes from said receiving means in said processing means;
(2) determining in said processing means the address of a first corresponding said editing instruction sequence corresponding to said one input code in a corresponding said section corresponding to said state value in said editing table using said input code and said state value;
(3) receiving said editing instructions from said first corresponding said editing instruction sequence in said corresponding said section of said editing table in said processing means;
(4) responsive to said editing instructions in said first corresponding said editing instruction sequence in said corresponding said section, modifying by means of said processing means first certain data codes of said data codes;
(5) for each data code of at least said first certain data codes, performing the steps of
(a) setting said state value to said echo state
(b) receiving said data code from said buffer in said processing means,
(c) determining in said processing means the address of a second corresponding said editing instruction sequence in said display section of said editing table using said data code and said echo value,
(d) receiving said editing instructions from said second corresponding said editing instruction sequence in said editing table in said processing means, and
(e) responsive to said editing instructions in said second corresponding said editing instruction sequence, providing a sequence of said display codes to said display means.

32. In a data processing system, the method of employing processing means to modify data codes contained in a buffer in memory accessible to said processing means in response to input codes including control codes received by said processing means from receiving means accessible to said processing means and to display visual representations on display means accessible to said processing means and responsive to display codes, said processing means being responsive to state values including at least an echo state value contained in control data in memory accessible to said processing means and to editing instructions in editing instruction sequences in an editing table in memory accessible to said processing means, said editing instruction sequences including certain editing instruction sequences for setting said state values, said editing instruction sequences being contained in sections in said editing table corresponding to said state values, and said sections including at least a display section corresponding to said echo value, and said method comprising the steps of:

(1) receiving one input code of said input codes from said receiving means in said processing means;
(2) determining in said processing means the address of a first corresponding said editing instruction sequence corresponding to said one input code in an corresponding said section corresponding to said state value in said editing table using said input code and said state value;
(3) receiving said editing instructions from said first corresponding said editing instruction sequence in said corresponding said section of said editing table in said processing means;
(4) if said one input code is a said control code, responsive to said certain editing instructions in said corresponding said editing instruction sequence, setting said state value to a new state value;
(5) receiving a next input code of said input codes from said receiving means in said processing means;
(6) determining in said processing means the address of a corresponding said editing instruction sequence corrresponding to said next input code in a corresponding said section corresponding to said new state value in said editing table using said next input code and said new state value;

(7) receiving said editing instructions from said corresponding said editing instruction sequence for said next input code in said corresponding said section of said editing table for said new state value in said processing means; and (8) responsive to said editing instructions in said processing means, modifying by means of said processing means first certain data codes of said data codes; and (9) for each said data code of at least said first certain data codes, performing the steps of (a) setting said state value to said echo state (b) receiving said data code from said buffer in said processing means, (c) determining in said processing means the address of a second corresponding said editing instruction sequence in said display section of said editing table using said data code and said echo value, (d) receiving said editing instructions from said second corresponding said editing instruction sequence in said editing table in said processing means, and (e) responsive to said editing instructions in said second corresponding said editing instruction sequence, providing a sequence of said display codes to said display means.

33. In a data processing system, the method of employing processing means responsive to state values contained in control data contained in memory accessible to said processor means, said state values including at least an echo state value, and to editing instructions in editing instruction sequences contained in sections corresponding to said state values in an editing table in memory accessible to said processing means, said sections including at least a display section corresponding to said echo state value, to modify data codes contained in a buffer in memory accessible to said processing means in response to input codes received by said processing means from receiving means accessible to said processing means, and to display visual representations on display means accessible to said processing means and responsive to display codes, said method comprising the steps of:

(1) receiving said data codes from said data processing system into said buffer;

(2) receiving said input codes from said receiving means until a delimiter code of said input codes is received and for each of said input codes except said delimiter code performing the steps of (a) determining in said processing means the location of a corresponding said section using said state value and the location of a first corresponding said editing instruction sequence in said corresponding said section using said input code;

(b) receiving said editing instructions from said first corresponding said editing instruction sequence in said editing table in said processing means, and (c) responsive to said editing instructions in said first corresponding said editing instruction sequence, modifying by means of said processing means first certain data codes of said data codes, (d) for each said data code of at least said first certain data codes, performing the steps of (i) setting said state value to said echo state value, (ii) receiving said data code from said buffer in said processing means, (iii) determining in said processing means the location of said display section using said echo state value and the location of a second corresponding said editing instruction sequence in said display section using said data code, (iv) receiving said editing instructions from said second corresponding said editing instruction sequence in said editing table in said processing means, and (iv) responsive to said editing instructions in said second corresponding said editing instruction sequence, providing a sequence of said display codes to said display device; and (3) on receipt of said delimiter code, responding to said delimiter code by returning said data codes in said buffer to said data processing system.

34. In the method of claim 33, and wherein:

said memory accessible to said processing means contains a plurality of said editing tables; said step (1) further includes receiving a specifier from said digital computer system specifying one editing table of said plurality of said editing tables; and said processing means responds to said editing instructions from said one editing table in said step (2).

35. In the method of claim 33, and wherein:

said step (1) further includes receiving said editing table from said data processing system.

36. In the method of claim 33, 34, or 35, and wherein:

said editing table includes an initial portion containing initial editing instructions of said editing instructions and a final portion containing final editing instructions of said editing instructions;

said step (1) further includes receiving said initial editing instructions from said initial portion in said processing means and responding by means of said processor means to said initial editing instructions; and said step (3) further includes receiving said final editing instructions from said final portion in said processing means and responding by means of said processor means to said final editing instructions.

* * * * *